(12) United States Patent
Ito

(10) Patent No.: US 6,739,724 B2
(45) Date of Patent: May 25, 2004

(54) ILLUMINATION OPTICAL SYSTEM AND PROJECTOR

(75) Inventor: Yoshitaka Ito, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 9 days.

(21) Appl. No.: 10/175,068

(22) Filed: Jun. 20, 2002

(65) Prior Publication Data

US 2003/0043348 A1 Mar. 6, 2003

(30) Foreign Application Priority Data

Jun. 22, 2001 (JP) ........................... 2001-190289

(51) Int. Cl.[7] ............... G03B 21/14; G03B 21/00
(52) U.S. Cl. ............... 353/20; 353/31; 353/84; 353/33
(58) Field of Search .............. 353/30–34, 20, 353/81, 84, 122; 349/8, 9; 359/487, 490, 494, 495, 497

(56) References Cited

U.S. PATENT DOCUMENTS

| | | | | |
|---|---|---|---|---|
| 5,166,813 A | * | 11/1992 | Metz | 359/15 |
| 6,020,940 A | * | 2/2000 | Ishikawa et al. | 349/8 |
| 6,057,894 A | * | 5/2000 | Kobayashi | 349/5 |
| 6,102,545 A | * | 8/2000 | Ogino | 353/38 |
| 6,130,728 A | * | 10/2000 | Tsujikawa et al. | 349/9 |
| 6,142,633 A | * | 11/2000 | Takahara et al. | 353/20 |
| 6,217,173 B1 | * | 4/2001 | Huang et al. | 353/20 |
| 6,219,112 B1 | | 4/2001 | Yoneyama et al. | |
| 6,540,361 B1 | * | 4/2003 | Hayashi | 353/31 |
| 6,547,398 B2 | * | 4/2003 | Cho et al. | 353/31 |
| 2002/0093736 A1 | * | 7/2002 | Ori et al. | 359/487 |

FOREIGN PATENT DOCUMENTS

| | | |
|---|---|---|
| JP | 07-084218 | 3/1995 |
| JP | 10-161237 | 6/1998 |
| JP | 11-064794 | 3/1999 |
| JP | 11-202132 | 7/1999 |
| JP | 2000-019455 | 1/2000 |
| JP | WO00/46637 | 8/2000 |
| JP | 2000-292745 | 10/2000 |
| JP | 2000-298308 | 10/2000 |
| JP | 2001-75173 | 3/2001 |

* cited by examiner

*Primary Examiner*—Russell Adams
*Assistant Examiner*—Andrew Sever
(74) *Attorney, Agent, or Firm*—Oliff & Berridge, PLC

(57) ABSTRACT

The invention provides an illumination optical system that reduces polarization dependency of a light separation characteristic of a 45 degree dichroic surface and improves the image quality of the projector based on the color separation/synthesis optical system using the 45 degree dichroic surface. In the illumination optical system, green light and blue plus red light can be separated by a color light direction change element, and the polarization direction thereof are adjusted by a polarization change element.

27 Claims, 13 Drawing Sheets

ILLUMINATION OPTICAL SYSTEM AND PROJECTOR

BACKGROUND OF THE INVENTION

1. Field of Invention

The present invention relates to an illumination optical system which uniformizes in-plane illuminance distribution of the light emitted from a light source, and to a projector having such an optical system.

2. Description of Related Art

Currently, for liquid crystal projectors, so-called three-plate type reflective liquid crystal projectors, which use three reflective liquid crystal panels, is known. The three-plate type reflective liquid crystal projector separates the light emitted from a light source into lights of three colors, that is, three primary colors, red (R), green (G), and blue (B) by a color separation system. Then the separated three color lights illuminate three reflective liquid crystal panels for each color light, the three primary colors modulated by each of the reflective liquid crystal panels are synthesized, and the color image obtained by the synthesis is projected, in an enlarged form, onto a screen by the projection lens.

In the above-described reflective liquid crystal projectors, miniaturization of the apparatus is considered to be important, so that optical elements having dichroic planes disposed at 45° to the optical axis are often used for color separation and color synthesis. However, these projectors have a problem in that chrominance non-uniformity often occurs: by the polarization dependency of light separation characteristics of dichroic planes, thereby making it difficult to improve image quality.

Under this circumstance, several optical systems, which seldom cause chrominance non-uniformity in consideration of the characteristics of dichroic planes, and thus realize image quality improvement, have been proposed. For example, in Japanese Unexamined Patent Application Publication Nos. 7-84218 and 11-64794, optical systems have been proposed, in which a polarized beam splitter having a wavelength selection retardation film and a light separation function are used instead of dichroic planes for light separation. However, there remains a problem in that with a polarized beam splitter having a wavelength selection retardation film and light separation function, it is difficult to realize light separation which varies steeply, and that the cost becomes too high.

SUMMARY OF THE INVENTION

Accordingly, it is an object of the present invention to provide an illumination optical system which efficiently generates illumination light having specific color light with the polarization direction which is different by 90° to the polarization direction of the other color light, so that such illumination light can provide the illuminated area with uniform illuminance distribution. Furthermore, it is another object of the present invention to provide a projector to which such an illumination optical system is applied, thus in which the polarization dependency of dichroic planes which constitute the color separation/synthesis optical system is reduced, and high quality projection image is displayed.

According to a first aspect of the present invention, there can be provided an illumination optical system including a luminous flux division optical element which divides the light from a light source into a plurality of partial luminous fluxes and collects each partial luminous flux, a color light separation optical element which separates each of the partial luminous fluxes into first color partial luminous flux and second color partial luminous flux, and emits the first color partial luminous flux and the second color partial luminous flux in different directions with each other or in a direction parallel to each other, a polarization change element which includes a polarization beam splitter array in which a plurality of polarization separation films and a plurality of reflective films are arranged alternately, and a polarization direction rotation element which is disposed either at a position where light transmitted through the polarization separation film is emitted or at a position where light reflected by the reflective film is emitted. The first color partial luminous flux incident on the polarization separation film is uniformed in a first polarization direction, and the second color partial luminous flux incident on the reflective film is uniformed in a second polarization direction. The invention can also include a transmission optical element which is disposed either at an incident side or at an emitting side of the polarization change element, and transmits an image formed by the luminous flux division optical element to an illuminated area, and a superposition optical element for superposing partial luminous flux emitted from the polarization change element at the illuminated area.

With this arrangement, first, the light from a light source is divided into a plurality of partial luminous fluxes and collected by the luminous flux division optical element, and each of the partial luminous fluxes is separated into the first color partial luminous flux and the second color partial luminous flux. The separated first color light and second color light enter the polarization change element having the polarization beam splitter array and the polarization direction rotation element, and are transformed into the first color partial luminous flux and second color partial luminous flux, each luminous flux having desired polarization state for each color light. Here, the polarization beam splitter array has a structure in which a plurality of pairs of polarization separation film and reflective film are arranged, and the polarization direction rotation elements are disposed at the emitting side of the polarization beam splitter array by selecting the positions corresponding to the positions of the polarization separation films or those of the reflective films.

For example, the polarization direction rotation elements are disposed only at the emitting side of the polarization separation films. Accordingly, of the first color partial luminous flux and the second color partial luminous flux, one enters a polarization separation film, and the other enters a reflective film selectively. Furthermore, the first color partial luminous flux and second color partial luminous flux are individually separated at the polarization beam splitter array into two kinds of polarization luminous fluxes, that is, a partial luminous flux having the first polarization direction which allows transmission of the polarization separation film and a partial luminous flux having the second polarization direction which is reflected by the polarization separation film.

Of the two kinds of polarization luminous fluxes, the polarization direction of one of the polarization luminous fluxes is rotated about 90° by passing through a retardation film (polarization direction rotation element) such as a λ/2 wavelength plate. Since the first color partial luminous flux and the second color partial luminous flux enter different films (polarization separation film and reflective film), respectively, the first color partial luminous flux and the second color partial luminous flux are uniformed in different polarization directions such that the first color partial luminous flux is uniformed in a first polarization direction and the second color partial luminous flux is uniformed in a second polarization direction.

For example, every first color partial luminous flux is arranged in S polarization light and every second color partial luminous flux is arranged in P polarization light. Then these partial luminous fluxes are superposed at the illuminated area through the superposition optical element. The transmission optical element has a function to transmit each partial luminous flux to the illuminated area The transmission optical element can be disposed either at the incident side or at the emitting side of the polarization change element. If the transmission optical element is disposed at the incident side of the polarization change element, each partial luminous flux becomes possible to enter the polarization change element at a predetermined angle, thereby making it easy to improve the polarization separation function of the polarization separation film. Thus, on the point of illumination efficiency, it is more advantageous to dispose the transmission optical element at the incident side of the polarization change element. On the other hand, if the transmission optical element is disposed at the emitting side of the polarization change element, it is possible to make one-piece optical element including the superposition optical element and the transmission optical element by implementing the function of the superposition optical element in the superposition optical element. It is therefore more advantageous to dispose the transmission optical element at the emitting side of the polarization change element when the number of parts needs to be reduced. As described above, according to the first aspect of the present invention, non-polarized light from a light source is transformed into polarization luminous flux which has a uniform polarization direction for each color light in advance. Thus, it is possible to reduce the polarization dependency of the optical elements, such as dichroic prisms and polarization beam splitters, which are disposed at more downstream side of the light path than the illumination optical system. It is therefore also possible to increase illumination efficiency.

Further, according to a second aspect of the present invention, there can be provided an illumination optical system including a color light separation optical element which separates the light from a light source into a first color light and a second color, light, and emits the first color light and the second color light in different directions with each other or in a direction parallel to each other, a luminous flux division optical element which divides the first color light into a plurality of the first color partial luminous flux, divides the second color light into a plurality of the second color partial luminous flux, and collects each of the partial luminous fluxes. The invention can further include a polarization change element which includes a polarization beam splitter array in which a plurality of polarization separation films and a plurality of reflective films are arranged alternately, and a polarization direction rotation element which is disposed either at a position where the light transmitted through the polarization separation film is emitted or at a position where the light reflected by the reflective film is emitted. The first color partial luminous flux incident on the polarization separation film is uniformed into polarized light having a first polarization direction, and the second color partial luminous flux incident on the reflective film is uniformed into polarized light having a second polarization direction. The invention can further include a transmission optical element which is disposed either at an incident side or at an emitting side of the polarization change element, and transmits an image formed by the luminous flux division optical element to an illuminated area, and a superposition optical element for superposing partial luminous flux emitted from the polarization change element at the illuminated area.

With this arrangement, first, the light from a light source is separated into the first color light and the second color light by the color light separation optical element. The first color light and the second color light are individually divided into a plurality of partial luminous fluxes and collected by the luminous flux division optical element. Specifically, the first color light is divided into the first color partial luminous fluxes, and the second color light is divided into the second color partial luminous fluxes. Each of these partial luminous fluxes enters the polarization change element having the polarization beam splitter array and the polarization direction rotation element, and is transformed into the first color partial luminous flux and second color partial luminous flux, each partial luminous flux having desired polarization state for each color light. Here the structure of the polarization beam splitter array is the same as that of the illumination optical system of the first aspect described above. Accordingly, of the first color partial luminous flux and the second color partial luminous flux, one enters into a polarization separation film, and the other enters into a reflective film. The subsequent operation is the same as that of the previous illumination optical system of the first aspect.

In the case of illumination optical system of the second aspect, non-polarized light from a light source is transformed into polarization luminous flux which has a uniform polarization direction for each color light in advance, thus it is possible to obtain the same effect as that of the first aspect. Furthermore, in the illumination optical system of the second aspect, since the color light separation optical element is disposed between the light, source and the luminous flux division optical system, highly parallel light can be entered into the color light separation optical element. Thus in the color light separation optical element, separation of color light can be performed much more efficiently without fail. In this regard, in the illumination optical system of the second aspect, as is the case with the illumination optical system of the first aspect, the transmission optical element can be disposed either at the incident side or at the emitting side of the polarization change element.

Furthermore, according to a third aspect of the present invention, there can be provided an illumination optical system including a luminous flux division optical element which divides light from a light source into a plurality of partial luminous fluxes and collects each of the partial luminous fluxes, a color light separation optical element which separates the each partial luminous flux into first color partial luminous flux and second color partial luminous flux, and emits the first color partial luminous flux and the second color partial luminous flux in different directions with each other or in a direction parallel to each other, and a polarization change element which includes a polarization beam splitter array in which a plurality of polarization separation films are arranged at a predetermined interval, and polarization direction rotation elements which are arranged at the predetermined interval and are disposed at an emitting side of the polarization beam splitter array. The first color partial luminous flux incident on an incident side end plane of the polarization separation film where the polarization direction rotation elements are not disposed at an emitting side of the film and transmitting through the polarization separation film, and the first color partial luminous flux reflected by the polarization separation film and then reflected by an adjacent polarization separation film once again and transmitting through the polarization direction rotation elements are uniformed in a first polarization direction to be emitted, while the second color partial luminous flux incident on an incident side end plane of the polarization separation film where the polarization direction rotation elements are disposed at an emitting side of the film and transmitting through the polarization separation film and then transmitting through the polarization direction rotation element, and the second color partial luminous flux reflected by the polarization separation film and then reflected by an adjacent polarization separation film once again are uniformed in a second polarization direction to be emitted. The invention can also include a transmission optical element which is disposed either at an incident side or at an emitting side of the polarization change element, and transmits an image formed by the luminous flux division optical element on an illuminated area, and a superposition optical element for superposing partial luminous flux emitted from the polarization change element at the illuminated area.

With this arrangement, first, the light from a light source is divided into a plurality of partial luminous fluxes and collected by the luminous flux division optical element, and each of the partial luminous fluxes is separated into the first color partial luminous flux and the second color partial luminous flux by the luminous flux division optical element. The separated first color light and second color light enter the polarization change element having the polarization beam splitter array and the polarization direction rotation element, and are transformed into the first color partial luminous flux and second color partial luminous flux, each partial luminous flux having desired polarization state for each color light. Here, the polarization beam splitter array has a structure in which a plurality of polarization separation films are arranged, and polarization direction rotation elements are disposed at the emitting side of the polarization beam splitter array by selecting the positions corresponding to the specific positions of the polarization separation films. For example, the polarization direction rotation elements are disposed only at the emitting side of every other polarization separation films. Now, suppose the polarization separation film which is provided with the polarization direction rotation element at the emitting side is referred to as a polarization separation film A, and the polarization separation film which is not provided with the polarization direction rotation element at the emitting side is referred to as a polarization separation film B for convenience sake. Accordingly, of the first color partial luminous flux and the second color partial luminous flux, one enters the polarization separation film B, and the other enters the polarization separation film A, selectively.

In the same manner as the polarization separation film described above, the polarization separation films A and B separate the entered partial luminous flux into partial luminous flux having the first polarization direction which allows transmission and partial luminous flux having the second polarization direction which is reflected. The partial luminous flux which has transmitted through the polarization separation film B is emitted from the polarization change element as the partial luminous flux having the first polarization direction. Also, the partial luminous flux which has been reflected by the polarization separation film B is the partial luminous flux having the second polarization direction, is reflected once again by the adjacent polarization separation film A, and then is rotated about 90° by passing through a retardation film (polarization direction rotation element) such as a λ/2 wavelength plate. Then the partial luminous flux is emitted from the polarization change element as the partial luminous flux having the first polarization direction. On the other hand, the partial luminous flux which has transmitted through the polarization separation film A is the partial luminous flux having the first polarization direction, is rotated about 90° by passing through a retardation film such as a λ/2 wavelength plate, and is emitted from the polarization change element as the partial luminous flux having the second polarization direction. Furthermore, the partial luminous flux which has been reflected by the polarization separation film A is reflected once again by the adjacent polarization separation film B, and then is emitted from the polarization change element as the partial luminous flux having the second polarization direction.

Since the first color partial luminous flux and the second color partial luminous flux enter the polarization separation film distinguished by the existence of the polarization direction rotation element, the first color partial luminous flux and the second color partial luminous flux are uniformed in different polarization directions such that the first color partial luminous flux is uniformed in a first polarization direction and the second color partial luminous flux is uniformed in a second polarization direction.

For example, the first color partial luminous fluxes are all arranged in S polarization light and the second color partial luminous fluxes are all arranged in P polarization light. Then these partial luminous fluxes are superposed at the illuminated area through the superposition optical element. The subsequent operation is the same as that of the previous illumination optical system of the first aspect.

In the illumination optical system of the third aspect, as compared with the illumination optical systems of the first aspect and the second aspect, of the first color partial luminous flux and second color partial luminous flux within the polarization change element, it is possible with ease to make the difference of the light path length smaller between the partial luminous flux having the shortest light path and the partial luminous flux having the longest light path. Thus, in the illuminated area, it is possible to make the magnification factor of the first color partial luminous flux and the magnification factor of the second color partial luminous flux the same. Consequently, illumination efficiency can be improved. Also, while the polarization beam splitter arrays in the above-described illumination optical systems of the first and second aspects have the polarization separation films and the reflective films, the polarization beam splitter array in the illumination optical system,of the third aspect has only the polarization separation films. Thus the structure of the polarization beam splitter array is simple, and it is therefore easy to be manufactured.

Moreover, according to a fourth aspect of the present invention, there can be provided an illumination optical system including a color light separation optical element which separates light from a light source into first color light and second color light, and emits the first color light and the second color light in different directions with each other or in a direction parallel to each other, a luminous flux division optical element which divides the first color light into a plurality of the first color luminous fluxes, divides the second color light into a plurality of the second color luminous fluxes, and collects each of the partial luminous fluxes, and a polarization change element which includes a polarization beam splitter array in which a plurality of polarization separation films are arranged at a predetermined interval, and a polarization direction rotation elements which are arranged at the predetermined interval and are disposed at an emitting side of the polarization beam splitter array. The first color partial luminous flux incident on an incident side end plane of the polarization separation film where the polarization direction rotation elements are not disposed at an emitting side of the film and transmitting through the polarization separation film, and the first color partial luminous flux reflected by the polarization separation film and then reflected by an adjacent polarization separation film once again and transmitting through the polarization direction rotation element are uniformed in a first polarization direction to be emitted, while the second color partial luminous flux incident on an incident side end plane of the polarization separation film where the polarization direction rotation element is disposed at an emitting side of the film and transmitting through the polarization separation film and then transmitting through the polarization direction rotation element, and the second color partial luminous flux reflected by the polarization separation film and then reflected by an adjacent polarization separation film once again are uniformed in a second polarization direction to be emitted. The invention can also include a transmission optical element which is disposed either at an incident side or at an emitting side of the polarization change element, and transmits an image formed by the luminous flux division optical element on an illuminated area, and a superposition optical element for superposing the partial luminous fluxes emitted from the polarization change element at the illuminated area.

With this arrangement, first, the light from a light source is separated into the first color light and the second color light by the color light separation optical element. The first color light and the second color light are individually divided into a plurality of partial luminous fluxes and collected by the luminous flux division optical element. Specifically, the first color light is divided into the first color partial luminous fluxes, and the second color light is divided into the second color partial luminous fluxes. Each of these partial luminous fluxes enters the polarization change element having the polarization beam splitter array and the polarization direction rotation element, and is transformed into the first color partial luminous flux and second color partial luminous flux, each partial luminous flux having desired polarization state for each color light. Here the structure of the polarization beam splitter array is the same as that of the illumination optical system of the third aspect described above. Accordingly, the first color partial luminous flux enters the polarization separation film B, and the second color partial luminous flux enters the polarization separation film A individually by selecting positions. The subsequent operation is the same as that of the illumination optical system of the third aspect.

In the illumination optical system of the fourth aspect, in the same manner as the illumination optical system of the third aspect, as compared with the illumination optical systems of the first aspect and the second aspect, of the first color partial luminous flux and second color partial luminous flux within the polarization change element, it is possible to make the light path length difference smaller between the partial luminous flux having the shortest light path and the partial luminous flux having the longest light path. Thus, in the illuminated area, it is easily possible to make the magnification factor of the first color partial luminous flux and the magnification factor of the second color partial luminous flux the same. Consequently, illumination efficiency can be improved. Also, in the same manner as the illumination optical system of the third aspect, the structure of the polarization beam splitter array is simple, thus it is easy to be manufactured.

The color light separation optical element to be used in the illumination optical system of the first, the second, the third, and the fourth aspects can be constructed of two mirrors, one optical part having two mirrors, a reflective hologram, or a transmissive hologram.

When constructing the color light separation optical element by two mirrors, the first mirror may be set to a dichroic mirror for performing color separation, and the second mirror may be set to perform a reflective mirror. In general, dichroic mirrors and reflective mirrors have high reflection factor. Thus if such mirrors are used in the structure, it becomes possible to separate a color light with high efficiency without fail. Here, it is possible to construct a reflective mirror not only using a general reflective mirror which is formed with metal film such as aluminum, but also using a dichroic mirror which reflects specific color light. With this arrangement, unnecessary light (for example, infrared light ultraviolet light, and specific color light such as yellow light) can be removed from the illumination light by the color light separation optical element. Thus when using these illumination optical systems for a projector, it is possible to improve the reliability of the light modulation device used for the projector, and to improve image quality of the projection image. In this regard, the function of the second mirror is to reflect a specific color light which is transmitted through the first mirror, thus the second mirror is not necessarily a dichroic mirror. However, when using a dichroic mirror, it is easy to obtain higher reflection factor as compared with a general reflective mirror, and thus it is convenient to increase light utilization efficiency in the color light separation optical element.

Furthermore, when using two mirrors, it is preferable to dispose the first mirror and the second mirror as follows:

(1) The first mirror and the second mirror are not parallel to each other, the first mirror is disposed at an angle of 45° to the optical axis of the light source, and the second mirror is disposed at an angle of $(45+\alpha)°$ to the optical axis of the light source.

(2) The first mirror and the second mirror are not parallel to each other, the first mirror is disposed at an angle of $(45+)°$ to the optical axis of the light source, and the second mirror is disposed at the angle of 45° to the optical axis of the light source.

(3) The first mirror and the second mirror are not parallel to each other, the first mirror is disposed at an angle of $(45+\beta)°$ to the optical axis of the light source, and the second mirror is disposed at the angle of $(45-\beta)°$ to the optical axis of the light source.

(4) The first mirror and the second mirror are parallel to each other at a predetermined distance, and are disposed at an angle of 45° to the optical axis of the light source.

Particularly, when disposing the mirrors as in the cases (3) and (4), a color light can be separated symmetrically with respective to a predetermined axis, and thus it is preferable for simplifying the structure of the transmission optical element.

Also, in the above cases (1) to (3), the function of the color light separation optical element is to make the directions of the luminous fluxes which are emitted toward the polarization change element different between the first color partial luminous flux and the second color partial luminous flux. Thus in order to realize this function, the first mirror and the second mirror may be disposed not parallel to each other, and thus the disposition angles of the first mirror and the second mirror are not limited to the examples described above. However, the optical characteristic of the transmission optical element needs to be set appropriately in response to an incident angle of the color light to the transmission optical element.

Next, a description will be given of the case where the color light separation optical element is composed of an optical part having two mirrors. For an optical part having two mirrors, examples are as follows:

(A) An optical part including a plate translucent member, a dichroic mirror disposed on one of two planes opposed with each other of the translucent member, and a reflective mirror disposed on the other of the planes.

(B) An optical part including a plate translucent member, a rectangular prism fixed firmly on one of two planes opposed with each other of the translucent member, a reflective mirror disposed on the other of the planes, and a dichroic mirror disposed between the translucent member and the rectangular prism.

(C) An optical part including a plate translucent member, a plurality of small size rectangular prisms fixed firmly on one of two planes opposed with each other of the translucent member, a reflective mirror disposed on the other of the planes, and a dichroic mirror disposed between the translucent member and the rectangular prisms.

When the color light separation optical element is composed of one optical part like this, assembling the optical system can be made easily. Also, if one optical parts such as (B) or (C) is used, light enters the dichroic mirror through a rectangular prism having a refraction factor greater than 1. Thus the incident angle of the light on the dichroic mirror is narrowed, so that the light separation characteristic of the dichroic mirror is enhanced, and light path shift can be eliminated. Furthermore, if one optical part such as (C) is used, the prism part can be miniaturized, and thus the color light separation optical element can be miniaturized and the weight thereof can be saved. In this regard, it is possible to construct a reflective mirror not only using a general reflective mirror which is formed with metal film such as aluminum, but also using a dichroic mirror which reflects specific color light, and the above-described effect can be obtained. The function of the second mirror is to reflect a specific color light which has been transmitted through the first mirror, thus the second mirror is not necessarily a dichroic mirror. However, when using a dichroic mirror, it is easy to obtain a higher reflection factor as compared with a general reflective mirror, and thus it is convenient to increase light utilization efficiency in the color light separation optical element.

Furthermore, in the optical parts (A) to (C), one of the planes, on which a dichroic mirror is disposed and the other of the planes, on which a reflective mirror is disposed, are preferably arranged as follows:

(a) The one of the planes and the other of the planes are not parallel to each other, the one of the planes is disposed at an angle of 45° to the optical axis of the light source, and the other of the planes is disposed at an angle of $(45-\alpha)°$ to the optical axis of the light source.

(b) The one of the planes and the other of the planes are not parallel to each other, the one of the planes is disposed at an angle of $(45+\alpha)°$ to the optical axis of the light source, and the other of the planes is disposed at an angle of 45° to the optical axis of the light source.

(c) The one of the planes and the other of the planes are not parallel to each other, the one of the planes is disposed at an angle of $(45+\beta)°$ to the optical axis of the light source, and the other of the planes is disposed at an angle of $(45-\beta)°$ to the optical axis of the light source.

(d) The one of the planes and the other of the planes are parallel to each other with a predetermined distance therebetween, and are individually disposed at an angle of 45° to the optical axis of the light source.

Particularly, when disposing the mirrors as in the cases (c) and (d), a color light can be separated symmetrically with respective to a predetermined axis, and thus it is preferable for simplifying the structure of the transmission optical element.

Also, in the above cases (1) to (3), the function of the color light separation optical element is to make the direction of the first color partial luminous flux different from that of the second color partial luminous flux which are emitted toward the polarization change element. Thus in order to realize this function, the one of the planes and the other of the planes may be disposed not parallel to each other, and thus the disposition angles of the one of the planes and the other of the planes are not limited to the examples described above. However, the optical characteristic of the transmission optical element needs to be set appropriately in response to an incident angle of the color light to the transmission optical element.

Finally, a description will be given of the case where the color light separation optical element is made of a reflective hologram element or a transmissive hologram element. In this case, the color light separation optical element can be constructed of one plate hologram, thus the number of parts of the color light separation optical element can be reduced and the illumination optical system can be miniaturized and the weight thereof can be saved.

The luminous flux division optical element to be used for an illumination optical system can be constructed of a lens array, a mirror array, a light guiding rod having four reflection planes, and so forth. If a mirror array is used, the cost becomes lower than the case of using a lens array or a light guiding rod. Also, if a mirror array or a light guiding rod is used, spherical aberration, which always accompanies with a lens array, does not occur. Thus light condensing is enhanced, and illumination efficiency can be improved.

Also, in the illumination optical system of the present invention, it is further preferable to dispose a dichroic filter array in order to block unnecessary incident color light on an incident side of the polarization beam splitter array. When disposing such a dichroic filter array, even if a color light separation optical element having a relatively higher incident angle dependency in light separation characteristic, unnecessary color light is prevented from entering into the polarization beam splitter array. Thus the first color light and the second color light can be separated without fail. In this regard, when disposing the transmission optical element at the incident side of the polarization change element, the dichroic filter array can be disposed not only between the transmission optical element and the polarization change element, but also at the incident side of the transmission optical element.

Furthermore, in the illumination optical system of the present invention, the color light separation optical element preferably has a color separation characteristic that green light is separated from red and blue light. With this arrangement, it becomes easy to optimize the selection characteristic of the green light of the color light separation optical element. Thus if a illumination optical system having such a structure is applied to a projector, it becomes easier to enhance the contrast and utilization efficiency of green light, and it becomes possible to display a projection image with high contrast and brightness.

Moreover, using the illumination optical system described above, when constructing a projector having a light modulating device for modulating the light emitted from the illumination optical system and a projection lens for projecting the modulated light by the light modulating device, it is possible to reduce the polarization dependency of the optical elements disposed at more downstream side of the light path than the illumination optical system. Thus it becomes possible to improve the image quality and brightness of the projection image.

Particularly, the illumination optical system of the present invention is preferably applied to the following projector:

(I) A projector including an illumination optical system described above, a first reflective light modulation device for modulating the first color light emitted from the illumination optical system, a second reflective light modulation device for modulating the third color light included in the second color light emitted from the illumination optical system, a third reflective light modulation device for modulating the fourth color light included in the second color light emitted from the illumination optical system, and a polarization beam splitter for separating light emitted from the illumination optical system into the first color light and the second color light. The projector can also include a projection lens which includes a color light separation/synthesis element for separating the second color light into the third color light and the fourth color light and also for synthesizing light emitted from the second reflective light modulation device and light emitted from the third reflective light modulation device to emit light to the polarization beam splitter, wherein light selected by the polarization beam splitter out of light emitted from the first reflective light modulation device and light emitted from the color light separation/synthesis element is projected.

(II) A projector including an illumination optical system described above, a first reflective light modulation device for modulating the first color light included in light emitted from the illumination optical system, a second reflective light modulation device for modulating the third color light included in the second color light emitted from the illumination optical system, a third reflective light modulation device for modulating the fourth color light included in the second color light emitted from the illumination optical system, first to fourth polarization beam splitters, a first wavelength selection retardation film disposed between the first polarization beam splitter and the third polarization beam splitter, and a second wavelength selection retardation film disposed between the third polarization beam splitter and the fourth polarization beam splitter. The projector can also include a projection lens for projecting light emitted from the fourth polarization beam splitter, wherein the first polarization beam splitter separates light emitted from the illumination optical system into a first color light and a second color light, the second polarization beam splitter leads the first color light separated by the first polarization beam splitter into the first reflective light modulation device, and also leads the first color light modulated by the first reflective light modulation device into the fourth polarization beam splitter, the first wavelength selection retardation film rotates about 90° only a polarization direction of the third color light out of the third color light and the fourth color light included in the second color light separated by the first polarization beam splitter, the third polarization beam splitter leads the third color light and the fourth color light emitted from the first wavelength selection retardation film into the second reflective light modulation device and the third reflective light modulation device, and also leads the third color light and the fourth color light modulated by the second reflective light modulation device and the third reflective light modulation device into the second wavelength selection retardation film, the second wavelength selection retardation film rotates about 90° only a polarization direction of the third color light out of the third color light and the fourth color light emitted from the third polarization beam splitter, and the fourth polarization beam splitter synthesizes the first color light emitted from the second polarization beam splitter, and the third color light and the fourth color light emitted from the second wavelength selection retardation film, and emits it toward the projection lens.

(III) A projector including an illumination optical system described above, a color separation optical system for separating light emitted from the illumination optical system into first color light, second color light, and third color light, a first transmissive light modulation device for modulating the first color light separated by the color separation optical system in response to an image signal, a second transmissive light modulation device for modulating the second color light separated by the color separation optical system in response to an image signal, a third transmissive light modulation device for modulating the third color light separated by the color separation optical system in response to an image signal, a color synthesis optical system for synthesizing the first color light, the second color light, and the third color light which have been modulated by the first transmissive light modulation device, the second transmissive light modulation device, and the third transmissive light modulation device, respectively, and a projection lens for projecting light synthesized by the color synthesis optical system.

When constructing a projector as described in (I), (II), and (III), the polarization dependency of the light separation characteristic of a dichroic mirror, a dichroic prism, and a polarization beam splitter array can be reduced. Thus, it is possible to achieve high quality and high brightness of the projection image, as well as cost reduction of the optical system which performs color light separation and synthesis. Also, in a projector having a structure as described in (II), each color light reaches the projection lens entirely through two polarization beam splitters, and thus the contrast of the projection image of the projector can be further enhanced. In this regard, the first and the fourth polarization beam splitters can be replaced with a dichroic mirror or a dichroic prism, and the cost reduction can be achieved in this case. Furthermore, in the illumination optical system of the present invention, of the three color lights, that is, the first color light, the second color light, and the third color light, one color light can be emitted with having a different polarization state from those of the other two color lights. Usually, in a so-called three-plate type projector, which includes three transmissive light modulation devices for modulating the first color light, the second color light, and the third color light, respectively, and the color synthesis optical system for synthesizing the first color light, the second color light, and the third color light, which have been modulated by the respective transmissive light modulation devices, in order to improve the synthesis efficiency of the color light in the color synthesis optical system, a $\lambda/2$ wavelength plate is disposed just in front of or just at the back of the transmissive light modulation device. Accordingly, the polarization state of at least one color light of the incident light onto the color synthesis optical system differs from the polarization states of the other color lights. However, when using the illumination optical system of the present invention, the $\lambda/2$ wavelength plate used for such a purpose can be omitted. Consequently, cost reduction can be achieved.

For example, when the illumination optical system has a structure in which green light is emitted as S polarization light, and blue and red light is emitted as P polarization light, it is unnecessary to dispose a λ/2 wavelength plate just in front of or just at the back of the transmissive light modulation device. Also, when the illumination optical system has a structure in which green light is emitted as P polarization light, and blue and red light is emitted as S polarization light, the same number of λ/2 wavelength plates becomes necessary for each transmissive light modulation device just in front of or just at the back of all, that is, the first to the third, transmissive light modulation devices. In a light path for each color, the same number of λ/2 wavelength plates are disposed, thus chrominance non-uniformity can be reduced.

Furthermore, depending on the display characteristic of the transmissive light modulation device, the polarization state of the incident light onto the transmissive light modulation device may be limited. For example, when green light is entered as S polarization light, and blue and red light is entered as P polarization light into the transmissive light modulation device, the structure of the projector described in (III) is effective,

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

In the following, with reference to the accompanying drawings, a detailed description will be given of some embodiments of an illumination optical system and a projector, according to the present invention.

Figure 1:
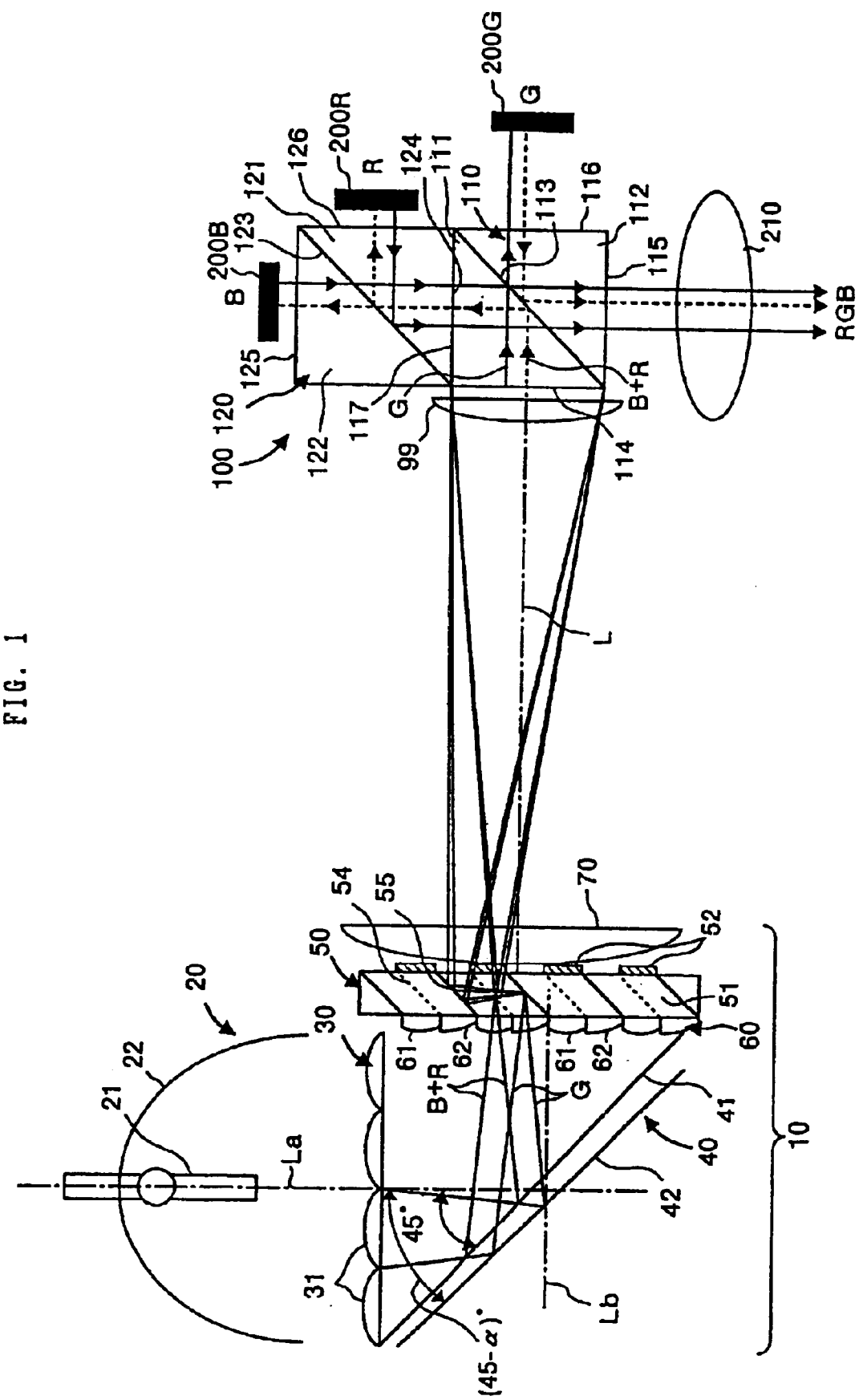
FIG. 1 is a schematic configuration diagram illustrating a first embodiment of the projector including an illumination optical system according to the present invention.

FIG. 1 illustrates an embodiment of the projector including an illumination optical system according to the present invention. The projector has an illumination optical system 10, a color separation/synthesis optical system 100, three reflective liquid crystal panels 200R, 200G, and 200B as light modulation devices, and a projection lens 210.

The illumination optical system 10 includes a light source 20 which emits nearly parallel luminous fluxes, a first lens array 30 which constitutes a luminous flux division optical element, a color light separation optical element 40, a polarization change element 50, a second lens array 60 which constitutes a transmission optical element, and a superposition lens 70 which is a superposition optical element, and has a function for generating illumination luminous flux having uniform polarization direction for each color light.

The light source 20 has a light source lamp 21 and a concave mirror 22. The light emitted from the light source lamp 21 is reflected by the concave mirror 22 to be light beam fluxes which are nearly parallel with each other and enter the first lens array 30. Here, for the light source lamp 21, a metal halide lamp, a xenon lamp, a high-pressure mercury lamp, and a halogen lamp can be used. For the concave mirror 22, a parabolic reflector, an ellipsoidal reflector, and a spherical reflector can be used.

The first lens array 30 has a structure in which a plurality of small lenses 31 each having an outline shape nearly similar to an illuminated area are arranged in an M×N matrix. In the present embodiment, the illuminated area is the display area of the reflective liquid crystal panel and the outline thereof is rectangular. Thus the small lenses 31 are set to have a rectangular outline. Each of the small lenses 31 divides the luminous fluxes which have entered from the light source 20 and are nearly parallel to each other, into a plurality (M×N) of partial luminous fluxes, and collects each partial luminous flux individually in the vicinity of the polarization change element 50. In other words, the polarization change element 50 is disposed at the position where the partial luminous fluxes from the first lens array 30 are collected.

Figure 16:
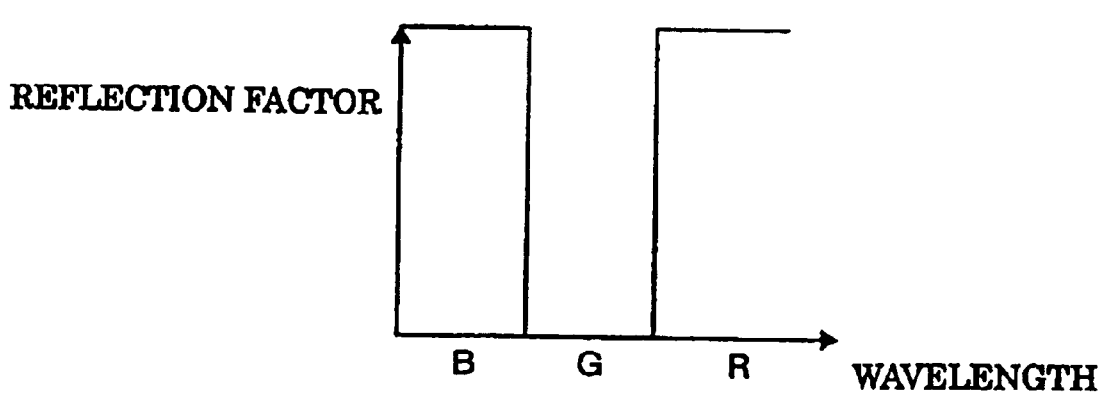
FIG. 16 is a schematic diagram illustrating a reflection characteristic of the dichroic mirror used in an illumination optical system according to the present invention.

The color light separation optical element 40 is disposed between the first lens array 30 and the second lens array 60, and includes a dichroic mirror 41 as a first mirror and a reflective mirror 42 as a second mirror, which is disposed at the back side of the first mirror 41. The dichroic mirror 41 has a light separation characteristic as shown in FIG. 16, reflects red light (R) and blue light (B), and transmits green light (G). The reflective mirror 42 is made of a general mirror formed by a metallic film, such as aluminum, etc., or a dichroic mirror which reflects green light (G). The function of the reflective mirror 42 is to reflect a specific color light which has been transmitted through the dichroic mirror 41, thus it is not necessarily a dichroic mirror. However, when using a dichroic mirror, it is easy to obtain a higher reflection factor as compared with a general reflective mirror, and thus it is convenient to increase light utilization efficiency in the color light separation optical element 40. In this regard, dichroic mirrors can be formed by dielectric multilayer films.

Accordingly, the dichroic mirror 41 can separate all the partial luminous fluxes emitted from the first lens array 30 into the first color partial luminous flux, which is. green light (G), and the second color partial luminous flux, which is composite color of red light (R) and blue light (B).

The dichroic mirror 41 and the reflective mirror 42 are in a state of not being parallel to each other, the dichroic mirror 41 is disposed at an angle of 45° to the optical axis La of the light source 20, and the reflective mirror 42 is disposed at an angle of $(45-\alpha)°$ to the optical axis La of the light source 20 (Note that $\alpha>0$). The dichroic mirror 41 may be disposed at an angle of $(45+\alpha)°$ to the optical axis La of the light source 20, and the reflective mirror 42 may be disposed at an angle of 45° to the optical axis La of the light source 20.

The color light separation optical element 40 emits the first color partial luminous flux (G) and the second color partial luminous flux (B+R) toward the second lens array 60 in different directions individually based on the difference of the disposition angle between the dichroic mirror 41 and the reflective mirror 42. In other words, the function of the color light separation optical element 40 is to have different directions of the luminous flux which is emitted toward the second lens array 60 from the first color partial luminous flux and the second color partial luminous flux. Thus in order to realize this function, the dichroic mirror 41 and the reflective mirror 42 may be disposed not parallel to each other, and thus the disposition angles of the dichroic mirror 41 and the reflective mirror 42 can be disposed at a angle different from the one described above. However, as described later, the shape and the optical characteristic of lenses 61 and 62 which constitute the second lens array 60 need to be set in response to an incident angle of the color light to the second lens array 60.

The second lens array 60 has a structure in which pairs of a concentric lens 61 which corresponds to each of the second color partial luminous fluxes (B+R) and an eccentric lens 62 which corresponds to each of the first color partial luminous fluxes (G) are arranged in an M×N matrix.

The second lens array 60 makes each of the second color partial luminous fluxes (B+R) to enter a polarization separation film 54 (described below) of the polarization change element 50 by the concentric lens 61, and makes each of the first color partial luminous fluxes (G) to enter a reflective film 55 (described below) of the polarization change element 50.

Here, the concentric lens 61 is a lens having an optical axis at the physical center of the lens body, and the eccentric lens 62 is a lens having an optical axis apart from the physical center of the lens body. These lenses 61 and 62 have a function to transmit the incident partial luminous flux effectively to the liquid crystal panel, that is, the illuminated area, and a function to make each of the partial luminous fluxes to enter the polarization change element 50 at a predetermined angle. In the case of the present embodiment, each of the partial luminous fluxes is entered into the polarization change element 50 nearly perpendicularly. The angle formed by the dichroic mirror 41 and the optical axis La is 45° so that each of the second color partial luminous fluxes (B+R) enters the polarization change element 50 nearly perpendicularly. Thus, the concentric lens 61 is employed for the lens for these pieces of the partial luminous flux. At the same time, the angle formed by the reflective mirror 42 and the optical axis La is $(45-\alpha)°$ so that each piece of the first color partial luminous (G) enters the polarization change element 50 a little inclined. Thus, the eccentric lens 62 is employed for the lens for these partial luminous fluxes. Specifically, the optical axis of the partial luminous flux is bent by the eccentric lens 62 to enter the polarization change element 50 nearly perpendicularly.

When the dichroic mirror 41 is disposed at an angle of $(45+\alpha)°$ to the optical axis La of the light source 20, and the reflective mirror 42 is disposed at an angle of 45° to the optical axis La of the light source 20, it is recommended that the position of the concentric lens 61 be replaced by the position of the eccentric lens 62, and the direction of the eccentric lens 62 be set to the contrary direction to that shown in FIG. 1 (the thin part of the lens is placed to the side of the light source 20). In this regard, it is desirable to set each piece of the partial luminous flux to enter into the polarization change element 50 nearly perpendicularly because the polarization separation performance of the polarization separation film 54 described below is easily increased. However, the polarization separation characteristic of the polarization separation film 54 can be changed by the film design. Accordingly, the second lens array 60 can be disposed at the emitting side of the polarization change element 50 depending on the optical characteristics of the polarization separation film 54 and the reflective film 55. In this case, the second lens array 60 has only a function to transmit the incident partial luminous flux to the liquid crystal panel which is the illuminated area Also, in this case, the second lens array 60 can have the function of the superposition lens 70 described below.

The polarization change element 50 includes a polarization beam splitter array 51 and a λ/2 wavelength plate 52 which is disposed at the emitting side of the polarization beam splitter array 51 as a polarization direction rotation element.

Figure 2:
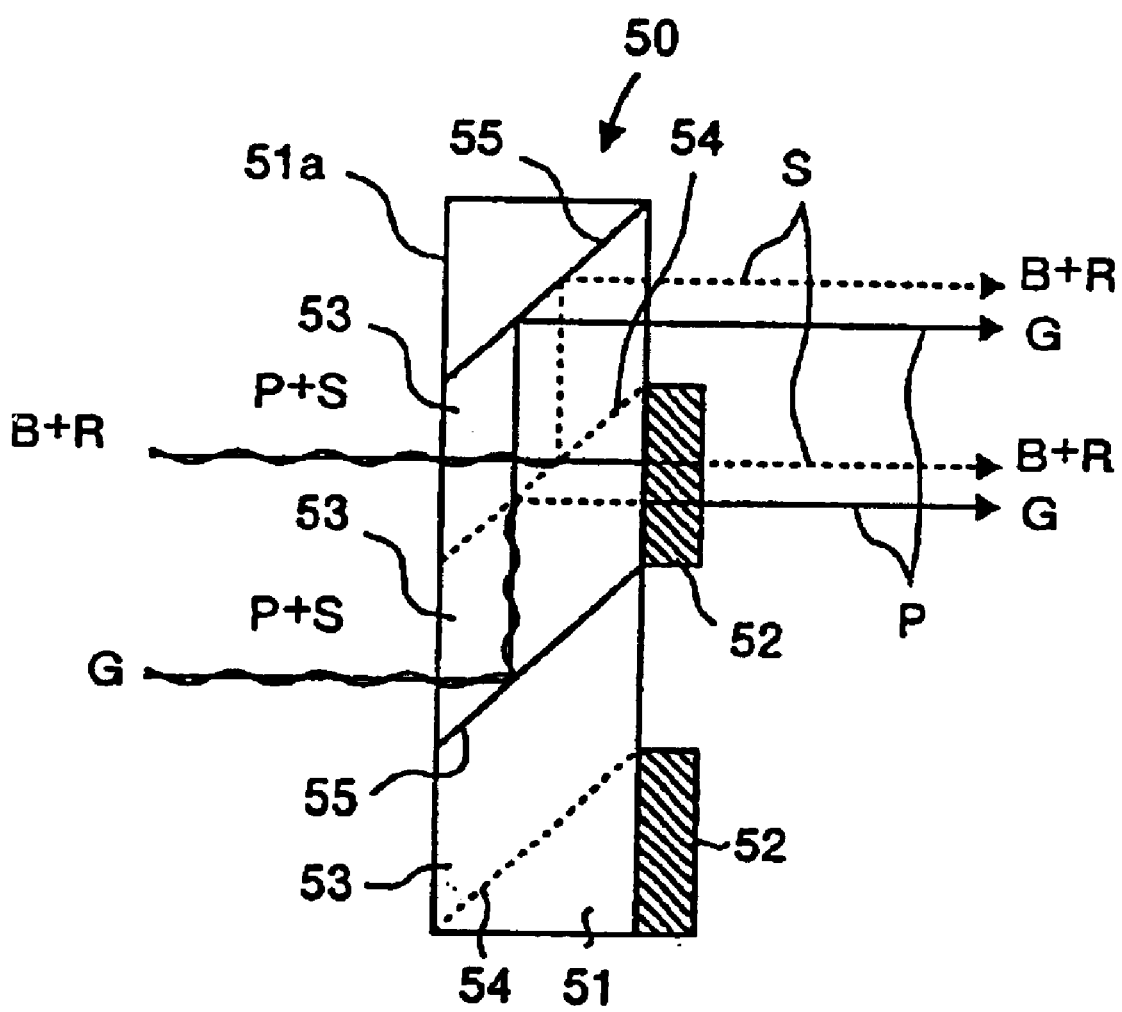
FIG. 2 is a sectional view illustrating the detailed structure of a polarization change element used in an illumination optical system according to the present invention.

As shown in FIG. 2, the polarization beam splitter array 51 has a structure in which a plurality of columnar translucent members 53 having a parallelogram sectional view are bonded. The translucent member 53 is generally made of optical glass, however, it may be composed of other materials (for example, plastics or crystal). On the boundary faces of the adjacent translucent members 53, the polarization separation films 54 and reflective films 55 are disposed interchangeably. The polarization separation film 54 and the reflective film 55 are inclined at a angle of about 45° to an incident end plane 51*a* of the polarization change element 50. Also, the polarization separation film 54 and the reflective film 55 make a pair, and the number of pairs corresponds to the number of columns N or the number of rows M of the first lens array 30.

The polarization separation films 54 is composed of a dielectric multilayer film, etc., and separates non-polarized light into two kinds of linearly polarized lights whose directions are orthogonal with each other. For example, it has a polarization separation characteristic which transmit the P polarization light and reflects the S polarization light. Also, the reflective film 55 is composed of a dielectric multilayer film, a metallic film, and so forth.

The λ/2 wavelength plate 52 is disposed at the position where the light which has been transmitted through the polarization separation films 54 is emitted, and rotates the polarization direction of the transmitting polarized light by 90°. This means that the P polarization light is transformed into the S polarization light, and the S polarization light is transformed into the P polarization light.

In this embodiment, with the combination of the polarization beam splitter array 51 and the λ/2 wavelength plate 52, the polarization change element 50 transforms the second color partial luminous flux (B+R), which enters the polarization separation film 54, into S polarized light as polarization light all having the second polarization direction, and transforms the first color partial luminous flux (G), which enters the reflective film 55, into P polarized light as polarization light all having the first polarization direction. In this regard, a description will be given later of the process of the transformation. Of course, it is possible to adopt a structure in which the λ/2 wavelength plate 52 is disposed at the position where the light reflected by the reflective film 55 is emitted, and the first color partial luminous flux (G) is transformed into the S polarized light and the second color partial luminous flux (B+R) is transformed into the P polarized light.

The superposition lens 70 is disposed at the emitting side of the polarization change element 50, and superpose all the partial luminous fluxes emitted from the polarization change element 50 on the illuminated area, that is, three reflective liquid crystal panels 200R, 200G, and 200B. In the vicinity of light entering part of the color separation/synthesis optical system 100, a parallelization lens 99 is disposed, and the transformation is performed such that the central light path of each partial luminous flux to the illuminated area is nearly parallel to the illumination axis L. Thus the illumination efficiency in the illuminated area is improved.

Next, a description will be given of the color separation/synthesis optical system 100. The color separation/synthesis optical system 100 has a polarization beam splitter 110, and a dichroic prism 120 which constitutes a color light separation/synthesis element. The polarization beam splitter 110 is an optical element in which a polarization separation film 113 is formed on the bonded surfaces of two rectangular prisms 111 and 112, and has one incident end plane 114, one emitting end plane 115, and two incident/emitting end planes 116 and 117. The polarization separation film 113 is made of a dielectric multilayer film, etc., and has polarization separation characteristic which, for example, transmits the P polarization light, and reflects the S polarization light.

The incident plane 114 of the polarization beam splitter 110 opposes the parallelization lens 99, and serves as an entry plane of the light from the illumination optical system 10. A projection lens 210 is placed opposite to the emitting plane 115 of the polarization beam splitter 110, and a reflective liquid crystal panel 200G is placed opposite to the incident/emitting end plane 116.

The dichroic prism 120 is an optical element in which a dichroic plane 123 is formed on the bonded surface with each other of two rectangular prisms 121 and 122, and has three incident/emitting end planes 124, 125, and 126. The dichroic plane 123 is made of a dielectric multilayer film, etc., and has a color separation characteristic which reflects at least red light. The incident/emitting end plane 124 of the dichroic prism 120 is bonded with the incident/emitting end plane 117 of the polarization beam splitter 110. Opposite to an incident/emitting end plane 125, a reflective liquid crystal panel 200B is placed, and opposite to an incident/emitting end plane 126, a reflective liquid crystal panel 200R is placed, individually.

Next, a description will be given of the function of a projector having the above-described structure.

The light from the light source 20 is divided into a plurality of partial luminous fluxes by each of the small lenses 31 of the first lens array 30, and they enter the color light separation optical element 40. Each of the partial luminous fluxes is separated into the first color partial luminous flux, which is green light (G), and the second color partial luminous flux, which is the composite color of the red light (R) and the blue light (B) by the dichroic mirror 41 of the color light separation optical element 40. Each second color partial luminous flux is reflected by the dichroic mirror 41 and enters into the polarization separation film 54 of the polarization beam splitter array 51 through the concentric lens 61 of the second lens array 60. At the same time, each first color partial luminous flux is transmitted through the dichroic mirror 41, is reflected by the reflective mirror 42, and enters the reflective film 55 of the polarization beam splitter array 51 through the eccentric lens 62 of the second lens array 60.

The second color partial luminous flux (B+R) which has entered the polarization separation film 54 of the polarization beam splitter array 51 is separated into the P polarization light which transmits the polarization separation film 54, and the S polarization light which is reflected. The P polarization light which has transmitted through the polarization separation film 54 is rotated about 90° by passing through the λ/2 wavelength plate 52 to be transformed into the S polarization light. On the other hand, the S polarization light which has been reflected by the polarization separation film 54 is reflected by the adjacent reflective film 55, and travels in the same direction as that of the polarization light which has transmitted though the polarization separation film 54. However, this polarization light does not transmit the λ/2 wavelength plate 52, thus the polarization direction is not changed, that is, so that it is the S polarization light without change. Thus the second color partial luminous flux (B+R) which has entered into the polarization separation film 54 is uniformed into the S polarization light, and emitted from the polarization change element 50.

At the same time, the first color partial luminous flux (G) which has entered the reflective film 55 of the polarization beam splitter array 51 enters the polarization separation film 54 through the reflective film 55. Thus the incident direction of the first color partial luminous flux (G) onto the polarization separation film 54 is different by 90° to the second color partial luminous flux (B+R). Accordingly, the S polarization light which has been reflected by the polarization separation film 54 through the reflective film 55 is rotated 90° with respect to the polarization direction to be transformed into the P polarization light by passing through the λ/2 wavelength plate 52. On the other hand, the P polarization light which has transmitted through the polarization separation film 54 through the reflective film 55 is reflected by another adjacent reflective film 55, and goes in the same direction as that of the polarization light which has been reflected by the polarization separation film 54. However, this polarization light does not transmit the λ/2 wavelength plate 52, thus the polarization direction is not changed, that is, so that it is the P polarization light without change. Thus the first color partial luminous flux (G) which has entered into the reflective 55 is uniformed into the P polarization light, and emitted from the polarization change element 50.

In this regard, in FIG. 2, the light representation by a solid line and the light representation by a broken line indicate the P polarization light and the S polarization light, respectively. This rule also is applied to the light representation in the color separation/synthesis optical system 100 portion in FIG. 1.

Each of the first color partial luminous fluxes (G) and each of the second color partial luminous fluxes (B+R), which are emitted from the polarization change element 50, are superposed onto the three reflective liquid crystal panels 200R, 200G, and 200B, that is, the illuminated area, by the superposition lens 70.

Of the luminous fluxes which have entered the polarization beam splitter 110 of the color separation/synthesis optical system 100 through the incident end plane 114, the first color partial luminous fluxes (G) are all the P polarization light, thus transmitted through the polarization separation film 113 of the polarization beam splitter 110 to go straight, and enter the reflective liquid crystal panel 200G from the incident/emitting end plane 116. The first color partial luminous flux (G) is modulated corresponding to the image information from the outside, which is not shown in the figure, by the reflective liquid crystal panel 200G, is transformed into the luminous flux which partially includes the S polarization light in accordance with the modulation, is also reflected by the reflective liquid crystal panel 200G to return to the incident/emitting end plane 116, and enters the polarization separation film 113 of the polarization beam splitter 110. Of the first color partial luminous fluxes (G), the luminous flux which has been modulated and transformed into the S polarization light is reflected by the polarization separation film 113, and enters the projection lens 210 through the emitting end plane 115. In this regard, since the reflective liquid crystal panels 200R, 200G, and 200B are well known, the detailed description of the structure and operation thereof is omitted.

At the same time, of the luminous fluxes which have entered the polarization beam splitter 110 of the color separation/synthesis optical system 100 through the incident end plane 114, all the second color partial luminous fluxes (B+R) are the S polarization light, thus are reflected by the polarization separation film 113 of the polarization beam splitter 110, and enter the dichroic plane 123 of the dichroic prism 120. Of the second color partial luminous flux (B+R) which has entered onto the dichroic plane 123 of the dichroic prism 120, the red light is reflected by the dichroic plane 123, and enters the reflective liquid crystal panel 200R through the incident/emitting end plane 126. The red light is modulated by the reflective liquid crystal panel 200R, is transformed into the luminous flux which partially includes the P polarization light in accordance with the modulation, is also reflected by the reflective liquid crystal panel 200R to return to the incident/emitting end plane 126, is reflected by the dichroic plane 123, and enters the polarization separation film 113 of the polarization beam splitter 110. Of the red light, the luminous flux which has been modulated and transformed into the P polarization light is transmitted through the polarization separation film 113, and enters the projection lens 210 through the emitting end plane 115.

Furthermore, of the second color partial luminous flux (B+R) which has entered the dichroic plane 123 of the dichroic prism 120, the blue light is transmitted through the dichroic plane 123, and enters the reflective liquid crystal panel 200B through the incident/emitting end plane 125. As well as the red light, the blue light is modulated by the reflective liquid crystal panel 200B, is also reflected by the reflective liquid crystal panel 200B to return to the incident/emitting end plane 125, is transmitted through the dichroic plane 123, and enters the polarization separation film 113 of the polarization beam splitter 110. Of the blue light, the luminous flux which has been modulated and transformed into the P polarization light is transmitted through the polarization separation film 113, and enters the projection lens 210 through the emitting end plane 115.

Figure 17:
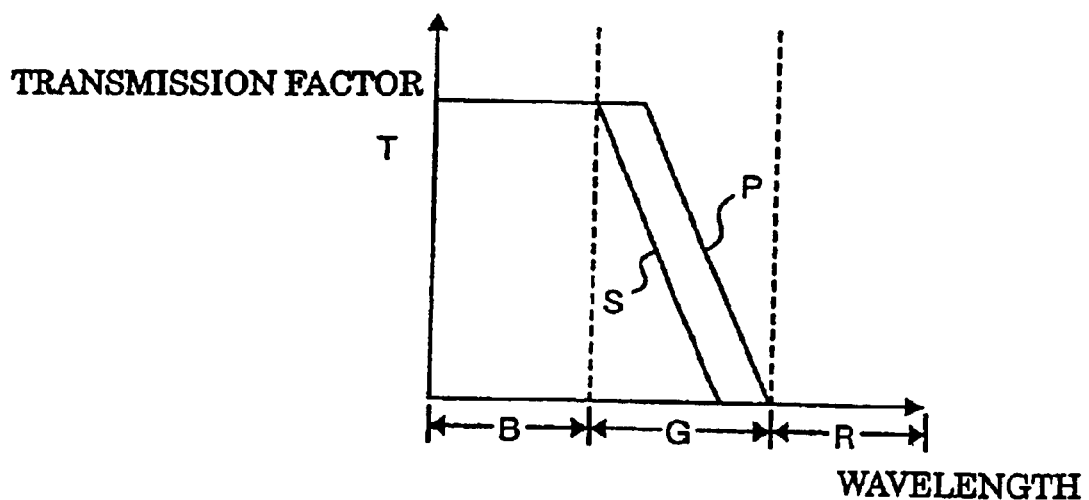
FIG. 17 is a schematic diagram illustrating a light separation characteristic of the dichroic prism used in an illumination optical system according to the present invention.

For the dichroic prism 120, the dichroic prism having a large polarization dependency as polarization characteristic as shown in FIG. 17 can be used. Since the light which is separated by the dichroic prism 120 is the red light (R) and the blue light (B),the wavelength area corresponding to the wavelength of the green light (G) not entered can be assigned to the transient wavelength area which shows a large polarization dependency. Thus the separation and synthesis of the red light (R) and the blue light (B) can be performed efficiently by the dichroic prism 120, and high quality image and high brightness can be achieved. Of course, it is possible to achieve a dichroic prism having a light separation of small polarization dependency depending on the construction of the dichroic plane. However, it needs a special film forming material, or the number of film forming becomes too many so that cost saving is difficult.

With the above-described arrangement, the polarization dependency of the light separating characteristic of the dichroic prism 120 can be reduced, and thus in a projector in which the dichroic prism 120 is used for the color separation/synthesis optical system, it becomes possible to improve image quality of the projection image and the cost reduction of the color separation/synthesis optical system can be achieved at the same time. Also, since the arrangement is made in which the first color partial luminous flux (G) passes only through the polarization beam splitter 110, the light utilization efficiency of the green light having a significant impact on the brightness is high, and thus improving the brightness can be easily achieved. Furthermore, in the illumination optical system 10, non-polarized luminous flux from the light source 20 is transformed into polarization luminous flux which has a uniform polarization direction for each color light in advance, and then enters the color separation/synthesis optical system 100, thus it is possible to increase illumination efficiency.

Figure 3:
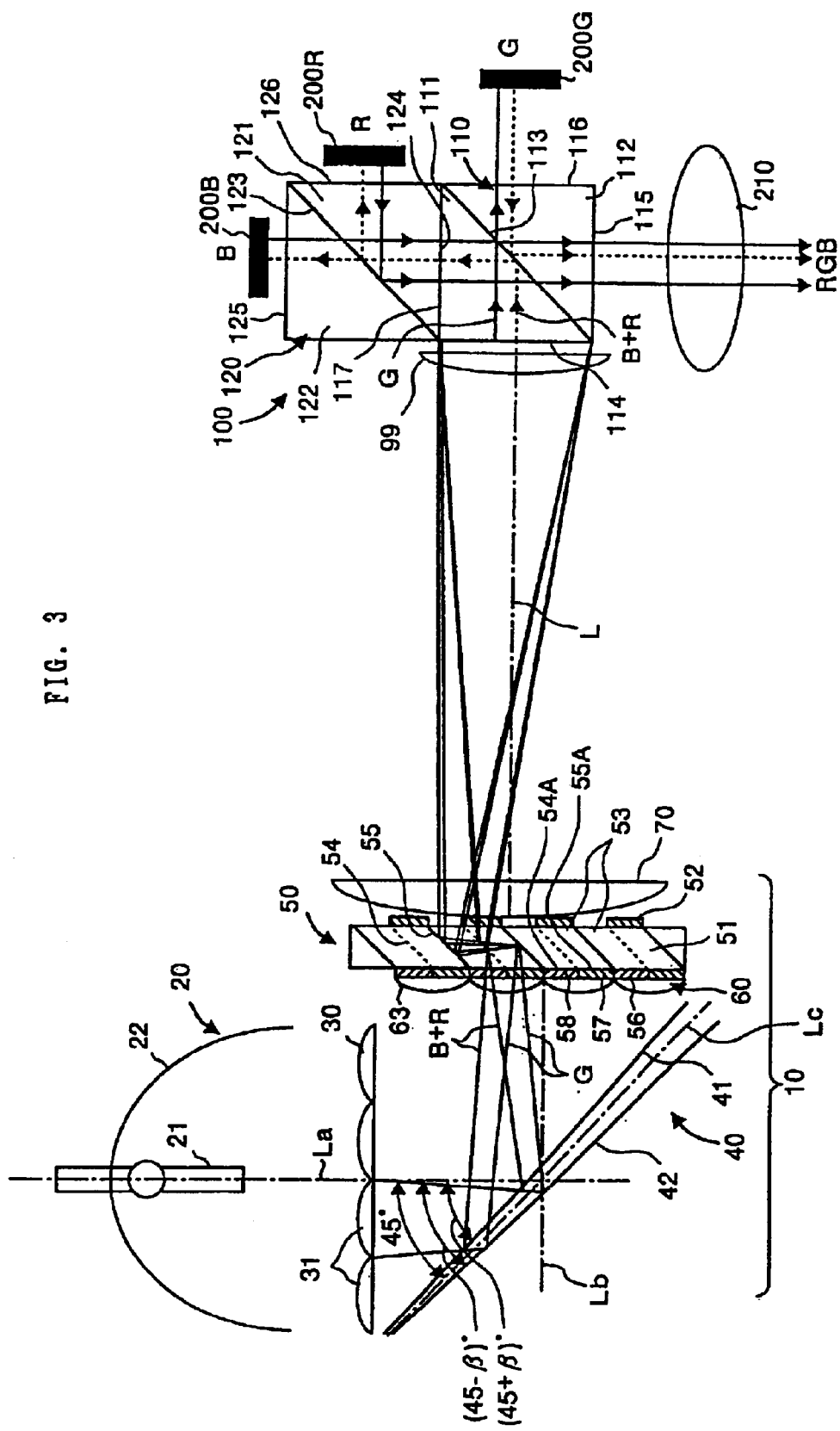
FIG. 3 is a schematic configuration diagram illustrating a second embodiment of the projector including an illumination optical system according to the present invention.

FIG. 3 illustrates another embodiment of the projector including an illumination optical system according to the present invention. This embodiment is different from the first embodiment described before in the disposition of the mirrors 41 and 42 of the color light separation optical element 40 and in that a dichroic filter array 56 is disposed. The other structure is the same as that of the first embodiment. In this regard, in each of the embodiments described below including the present embodiment, the same reference numerals as those given in FIGS. 1 and 2 will be given to the same component as each component which has already been described, and the description thereof will be omitted. Also, in the color separation/synthesis optical system 100 in FIG. 3, the light representation by a solid line and the light representation by a broken line indicate the P polarization light and the S polarization light, respectively.

In this embodiment, the dichroic mirror 41 and the reflective mirror 42 of the color light separation optical element 40 are not parallel to each other, the dichroic mirror 41 is disposed at an angle of $(45+\beta)°$ to the optical axis La of the light source 20, and the reflective mirror 42 is disposed at an angle of (45−β)° to the optical axis La of the light source 20 (note that β>0).

Also, at the incident side of the polarization beam splitter array 51, the dichroic filter array 56 is disposed in order to prevent unnecessary color light which is not a predetermined color light from entering into each of the polarization separation film 54 and the reflective film 55. In the present embodiment, the second color partial luminous flux (B+R) is set to enter onto the polarization separation film 54, and the first color partial luminous flux (G) is set to enter onto the reflective film 55. Accordingly, the dichroic filter array 56 is arranged such that a filter 58 which transmits only the second color partial luminous flux (B+R) and blocks the first color partial luminous flux (G) is disposed at the incident aperture 54A corresponding to the polarization separation film 54 of the polarization beam splitter array 51, and a filter 57 which transmits only the first color partial luminous flux (G) and blocks the second color partial luminous flux (B+R) is disposed at the incident aperture 55A corresponding to the reflective film 55.

In this embodiment, it is also possible to obtain the same effect as that of the first embodiment Furthermore, in this embodiment, the dichroic mirror 41 is disposed at an angle of (45+β)° to the optical axis La of the light source 20, and the reflective mirror 42 is disposed at an angle of (45−β)° to the optical axis La of the light source 20. The dichroic mirror 41 and the reflective mirror 42 are disposed such that the crossing angles formed by each of the mirrors and an optical axis Lc, by which an angle of 45° is formed with the optical axis La of the light source 20, become the same with each other. Thus, in the color light separation optical element 40, separation into two color lights is possible, that is, into first color partial luminous flux and the second color partial luminous flux with a symmetric angle to an optical axis Lb which is orthogonal to the optical axis La. Consequently, a lens 63 of the second lens array 60 can be constructed with the lens in which the concentric lens 61 and the eccentric lens 62 of the first embodiment described above are integrated. Accordingly, the second lens array 60 can be constructed by the equivalent lens with the first lens array 30, and thus further cost reduction can be achieved. Furthermore, the incident angle (45−β)° of the partial luminous flux to the dichroic mirror 41 can be smaller than 45° so that the incident angel dependency of the light separating characteristic of the dichroic mirror 41 can be reduced. Thus the separation of the first color partial luminous flux and the second color partial luminous flux can be performed with more precision without fail.

Also, the dichroic filter array 56 is disposed at the incident side of the polarization beam splitter array 51. Accordingly, even if using the dichroic mirror 41 having a relatively large incident angel dependency of the light separating characteristic, unnecessary color light can be prevented from entering the polarization beam splitter array 51. Thus the separation of the first color partial luminous flux and the second color partial luminous flux can be performed without fail. In this regard, the dichroic filter array 56 can be disposed in front of the second lens array 60.

Figure 4:
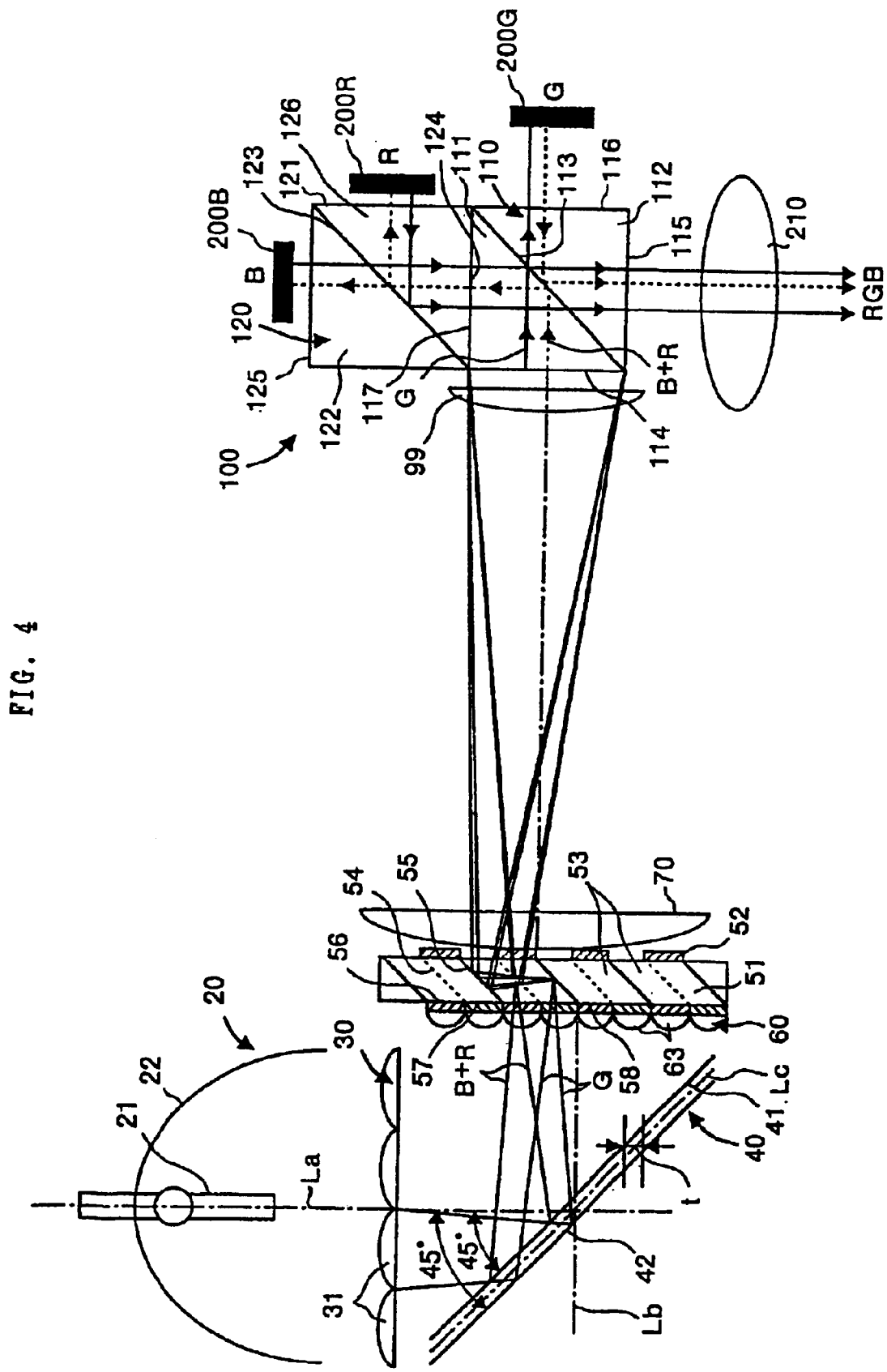
FIG. 4 is a schematic configuration diagram illustrating a third embodiment of the projector including an illumination optical system according to the present invention.

FIG. 4 illustrates another embodiment of the projector including an illumination optical system according to the present invention. This embodiment is different from the second embodiment described before mainly in the disposition of the mirrors 41 and 42 of the color light separation optical element 40 and the structure of second lens array 60. The other structure is the same as that of the second embodiment. In this regard, in the color separation/synthesis optical system 100 in FIG. 4, the light representation by a solid line and the light representation by a broken line indicate the P polarization light and the S polarization light, respectively.

In this embodiment, the dichroic mirror 41 and the reflective mirror 42 of the color light separation optical element 40 are parallel to each other, and disposed at a predetermined value t apart along the optical axis La Here, the predetermined value t is nearly equal to the distance between the polarization separation film 54 and the reflective film 55, which constitute the polarization beam splitter array 51, in the direction along the incident end plane 51a of the polarization beam splitter array 51. Both the dichroic mirror 41 and the reflective mirror 42 are disposed at an angle of 45° to the optical axis La of the light source 20.

In this embodiment, it is also possible to obtain the same effect as that of the first embodiment.

Furthermore, in this embodiment, by using the color light separation optical element 40 having such a structure, the first color partial luminous flux (G) and the second color partial luminous flux (B+R) can be emitted at different positions in a parallel state with each other. Accordingly, it is possible to make both the first color partial luminous flux (G) and the second color partial luminous flux (B+R) to enter the second lens array 60 perpendicularly so that an array constructed only by the concentric lens 61 can be used for the second lens array 60. Thus the structure of the second lens array 60 can be simplified, and further cost reduction can be achieved.

Figure 5:
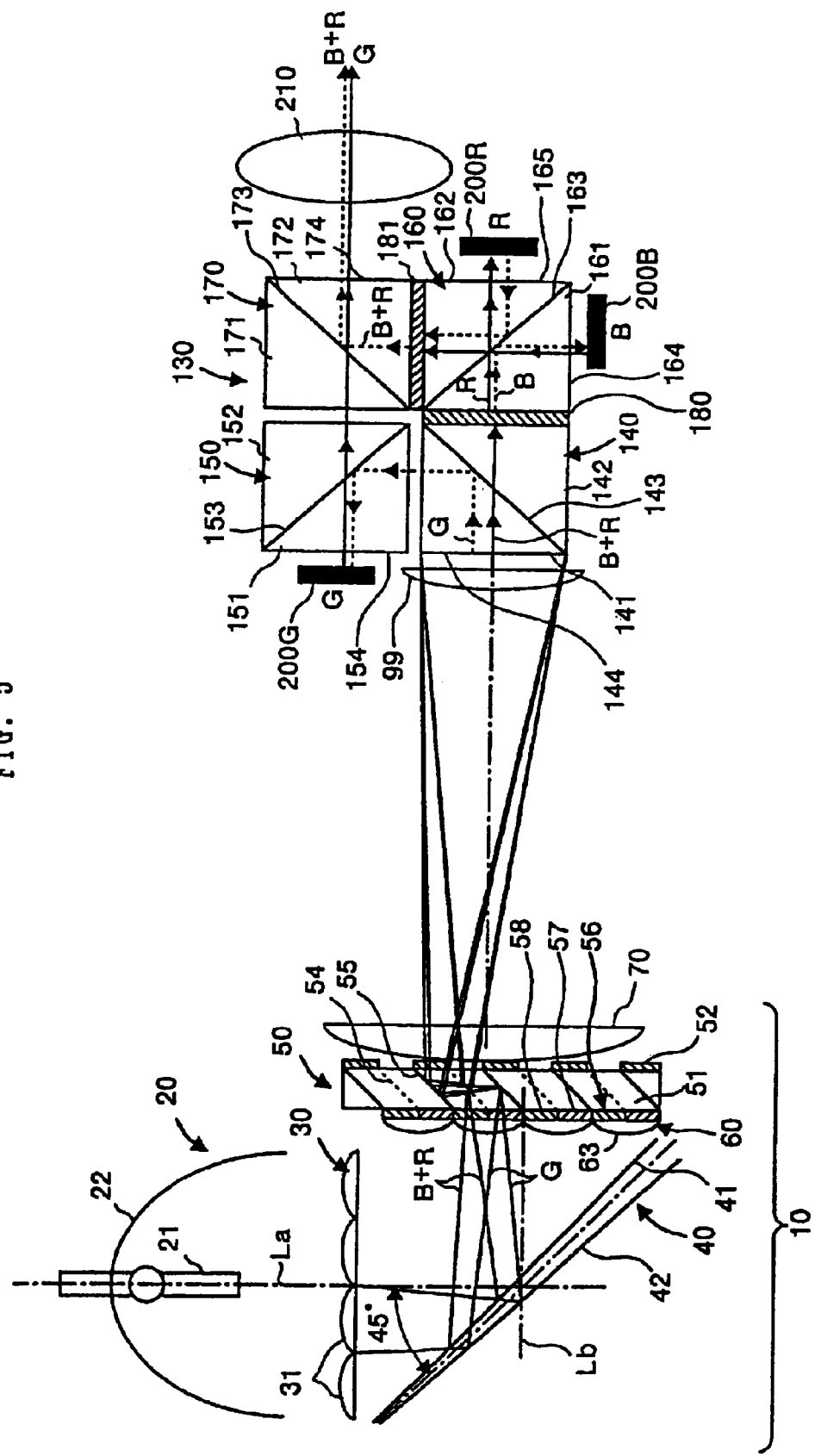
FIG. 5 is a schematic configuration diagram illustrating a fourth embodiment of the projector including an illumination optical system according to the present invention.

FIG. 5 illustrates another embodiment of the projector including an illumination optical system according to the present invention. This embodiment is different from the second embodiment described before in the structure of color separation/synthesis optical system. Also, the position of the λ/2 wavelength plate 52 of the polarization change element 50 is different. The other structure is the same as that of the second embodiment. Furthermore, in a color separation/synthesis optical system 130 in FIG. 5, which is described in greater detail below, the light representation by a solid line and the light representation by a broken line indicate the P polarization light and the S polarization light, respectively.

In this embodiment, the λ/2 wavelength plate 52 of the polarization change element 50 is disposed at the position where the light reflected by the reflective film 55 is emitted, and rotates 90° the polarization plane of the light emitted from the reflective film 55. By this means, the first color partial luminous fluxes (G) all become the S polarization light and the second color partial luminous fluxes (B+R) all become the P polarization light.

In this embodiment, the color separation/synthesis optical system 130 includes a first to a fourth polarization beam splitters 140, 150, 160, and 170 which are cuboids and are disposed with each other in the shape of a Chinese character meaning a rice field, a wavelength selection retardation film 180 disposed between the first polarization beam splitter 140 and the third polarization beam splitter 160, and a wavelength selection retardation film 181 disposed between the third polarization beam splitter 160 and the fourth polarization beam splitters 170.

The first polarization beam splitter 140 is an optical element having a cuboidal shape, which includes two rectangular prisms 141 and 142, and a polarization separation film 143 provided on the bonded face formed by the prisms. The polarization separation film 143 is formed by dielectric multilayer films, etc., and has a polarization separation characteristic, for example, transmitting only the P polarization light and reflecting the S polarization light. The second to the fourth polarization beam splitters 150, 160, and 170 have the same structure and similar polarization separation characteristic as those of the first polarization beam splitter 140. In this regard, in the figure, reference numerals 151, 152, 161, 162, 171, and 172 denote rectangular prisms.

Figure 18:
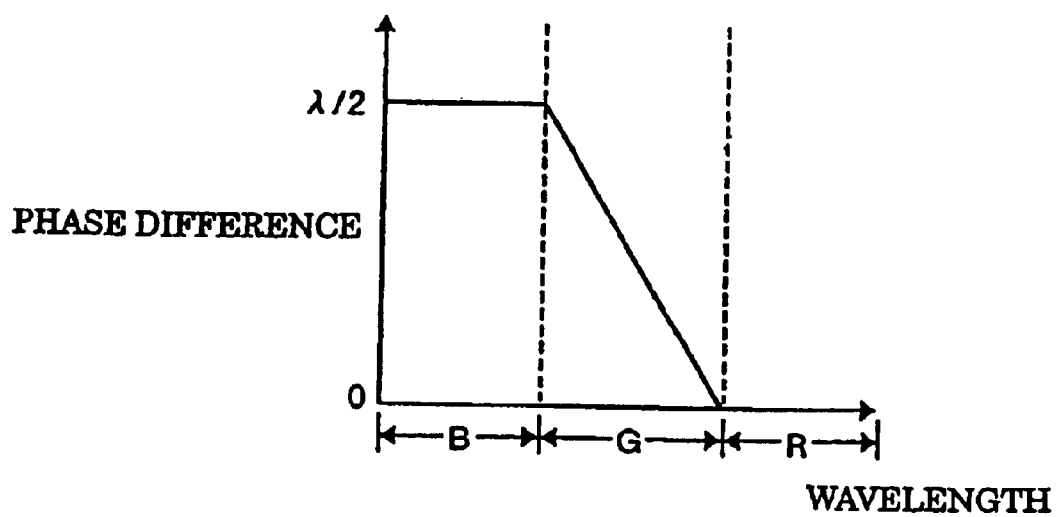
FIG. 18 is a schematic diagram illustrating an optical characteristic of the wavelength selection retardation film used in a projector using an illumination optical system according to the present invention.

The wavelength selection retardation films 180 and 181 have the optical characteristic as shown in FIG. 18, at least gives no phase change to the transmitting red light, gives a λ/2 phase change to the transmitting blue light, and thus rotates the polarization direction of the blue light by 90°. In the color separation/synthesis optical system 130, the incident end plane 144 of the first polarization beam splitter 140 is opposed to a parallelization lens 99 to form an entrance plane of the light from the illumination optical system 10. The reflective liquid crystal panel 200G is placed opposite to the incident/emitting end plane 154 of the second polarization beam splitter 150. Two reflective liquid crystal panels 200B and 200R are placed opposite to the incident/emitting end planes 164 and 165 of the third polarization beam splitter 160, respectively. A projection lens 210 is placed opposite to the emitting end plane 174 of the fourth polarization beam splitter 170.

Of the light emitted from the illumination optical system 10, the second color partial luminous flux (B+R), which is the P polarization light, is transmitted through the polarization separation film 143 of the first polarization beam splitter 140, and enters the wavelength selection retardation film 180. The first color partial luminous flux (G), which is the S polarization light, is reflected by the polarization separation film 143, and enters the second polarization beam splitter 150.

The second polarization beam splitter 150 leads the first color partial luminous flux (G), which is the S polarization light from the first polarization beam splitter 140, to the reflective liquid crystal panels 200G, and at the same time, leads the first color partial luminous flux (G), which has been light modulated to the P polarization light by the reflective liquid crystal panel 200G, to the fourth polarization beam splitter 170.

The wavelength selection retardation film 180 rotates about 90° only the direction of the blue light out of the blue light and red light included in the second color partial luminous flux (B+R) from the first polarization beam splitter 140. Accordingly, the P polarization red light and the S polarization blue light enter the third polarization beam splitter 160, and are separated by the difference of the polarization direction. Specifically, the P polarization red light is transmitted through a polarization separation film 163 of the polarization beam splitter 160, and goes to the reflective liquid crystal panel 200R. The S polarization red light is reflected by the polarization separation film 163, and goes to the reflective liquid crystal panel 200B. The red light and blue light, which are light modulated by the reflective liquid crystal panels 200R and 200B, are returned to the third polarization beam splitter 160 to be synthesized, and enter the wavelength selection retardation film 181.

The wavelength selection retardation film 181 rotates about 90° only the direction of the blue light out of the blue light (P polarization light) and red light (S polarization light) from the third polarization beam splitter 160. By this means, the S polarization red light and the S polarization blue light enter into the fourth polarization beam splitter 170. A polarization separation film 173 of the first polarization beam splitter 170 transmits the green light of the P polarization light from the second polarization beam splitter 150, reflects the S polarization red light and the S polarization blue light from the third polarization beam splitter 160, and synthesizes these three colors of light to be emitted to the projection lens 210.

Also, in the present embodiment, the same effect as described in the above-described embodiments can be obtained. Furthermore, in the present embodiment, each color light passes through two polarization beam splitters to go to the projection lens 210, and thus the contrast of the projection image of the projector can be increased. In this regard, it may be structured in which the first color partial luminous flux (G) is set to the P polarization light, the second color partial luminous flux (B+R) is set to the S polarization light, the two reflective liquid crystal panels 200R and 200B for the blue light and the red light are disposed at the side of the second polarization beam splitter 150, and the reflective liquid crystal panel 200G for the green light is disposed at the side of the third polarization beam splitter 160. In this case, the contrast of the green light can be further increased, and thus the projection image can be displayed with higher contrast. In the present embodiment, the dichroic mirror 41 and the reflective mirror 42 of the color light separation optical element 40 are disposed at the angles described in the second embodiment, however, they may be disposed at the angles described in the first and third embodiments.

Also the first polarization beam splitter 140 can be replaced with a dichroic mirror or a dichroic prism which reflects only the green light (G) and transmits the red light (R) and the blue light (B), while the fourth polarization beam splitter 170 can be replaced with a dichroic mirror or a dichroic prism which transmits only the green light (G) and reflects the red light (R) and the blue light (B). Furthermore, if the latter is selected, the wavelength selection retardation film 181 can be omitted. If such a structure is employed, it is convenient in that cost reduction can be easily achieved.
(Fifth embodiment)

Figure 6:
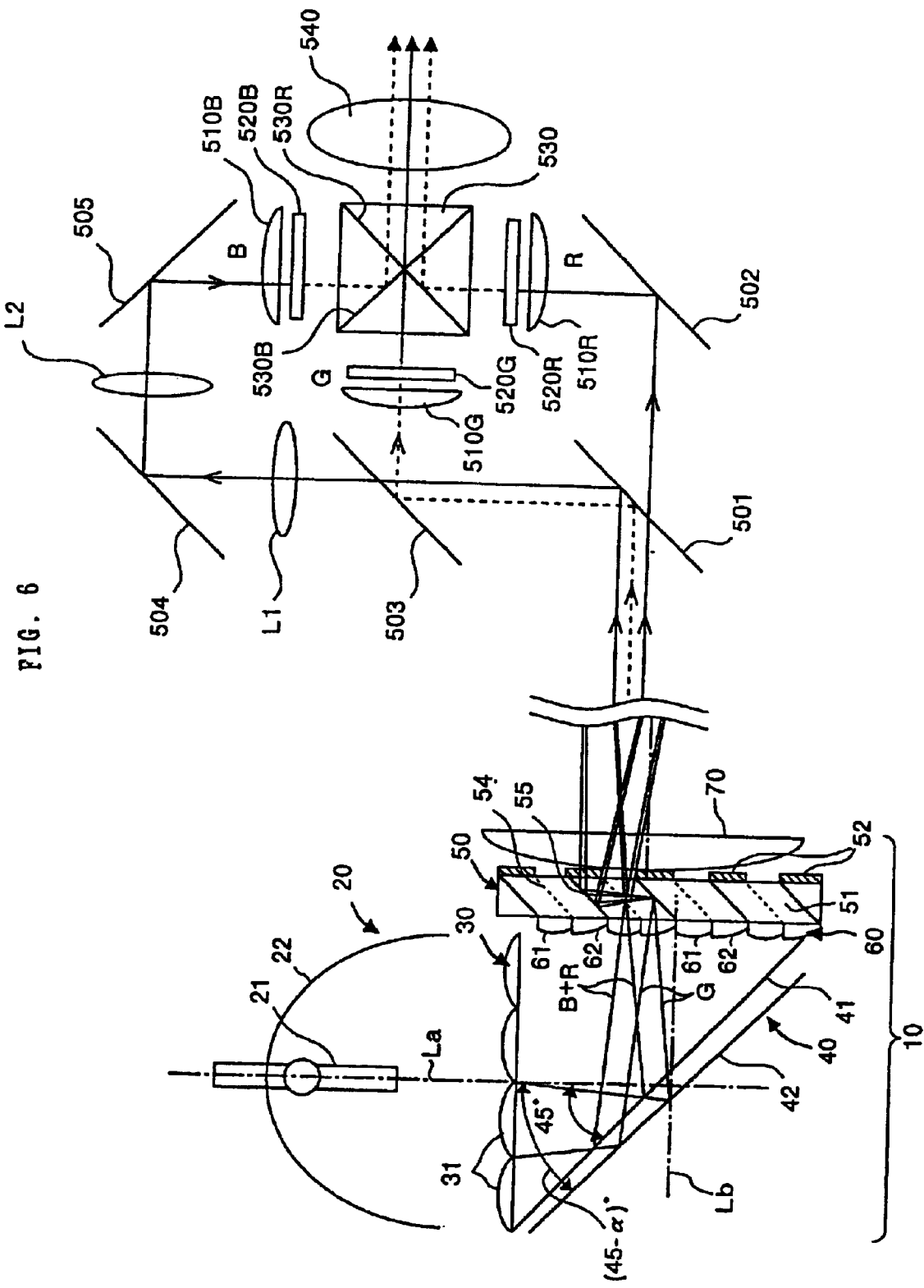
FIG. 6 is a schematic configuration diagram illustrating a fifth embodiment of the projector including an illumination optical system according to the present invention.

FIG. 6 illustrates a fifth embodiment of the projector including an illumination optical system according to the present invention. This embodiment is different from the first to the fourth embodiments described before in the use of transmissive light modulation device and a color separation optical system and a color synthesis optical system corresponding to the device. As the illumination optical system 10 of the present embodiment, the illumination optical system 10 used in one of the first to the fourth embodiments described above can also be applied. In the present embodiment, a description will be given of the structure in which the illumination optical system of the first embodiment is applied as an example. However, the position of the λ/2 wavelength plate 52 is shifted to the adjacent position from the position shown by the illumination optical system 10 in FIG. 1. Accordingly, the first color partial luminous flux (G) is emitted as the S polarization light, and the second color partial luminous flux (B+R) is emitted as the P polarization light. In this regard, in the present embodiment, the same reference numerals as those given in FIG. 1 will be given to the same component as that of the first embodiment, and the duplicated description thereof will be omitted. Also, in FIG. 6, the light representation by a solid line and the light representation by a broken line indicate the P polarization light and the S polarization light, respectively.

First, a description will be given of the first color partial luminous flux (G), which is the S polarization light, out of the lights emitted from the illumination optical system 10. The first color partial luminous flux (G) from the illumination optical system 10 enters a dichroic mirror 501. Here, the dichroic mirror 501 is set to have the optical characteristic in which the red light is transmitted, and the green light and the blue light are reflected. The green light reflected by the dichroic mirror 501 enters a dichroic mirror 503. Here, the dichroic mirror 503 is set to have the optical characteristic in which the blue light is transmitted, and the green light is reflected. The green light reflected by the dichroic mirror 503 enters a transmissive light modulation device 520G for green light through a parallelization lens 510G, is modulated in accordance with the image information from the outside which is not shown in the figure, and is emitted as the P polarization light corresponding to the degree of the modulation. In this regard, in the front and back of the three transmissive light modulation devices described below, pairs of polarization plates are disposed in order to increase the polarization degree of the incident light at the incident side and to eliminate unnecessary polarization light at the emitting side, notation of which is omitted in FIG. 6.

Next, a description will be given of the red light out of the second color partial luminous flux (B+R). The second color partial luminous flux (B+R) from the illumination optical system 10 enters the dichroic mirror 501. The red light transmitted through the dichroic mirror 501 is bent about 90° with respect to the light path by a reflective mirror 502, and then enters the transmissive light modulation device 520R for red light through a parallelization lens 510R. The red light, which is the P polarization light incident onto the transmissive light modulation device 520R, is modulated in accordance with the image information from the outside which is not shown in the figure, and is emitted as the S polarization light corresponding to the degree of the modulation.

Next, a description will be given of the blue light out of the second color partial luminous flux (B+R). The second color partial luminous flux (B+R) from the illumination optical system 10 enters the dichroic mirror 501. The blue light reflected by the dichroic mirror 501 is transmitted through the dichroic mirror 503, and then enters the transmissive light modulation device 520B for blue light through a relay optical system, which includes a first relay lens L1, a reflective mirror 504, a second relay lens L2, and a reflective mirror 505, and the parallelized lens 510B. The blue light which is the P polarization light incident onto the transmissive light modulation device 520B is modulated in accordance with the image signal in the same manner as the red light, and is emitted as the S polarization light. Here, the reason for using a relay optical system for the blue light path is to retrain the generation of the chrominance non-uniformity and the brightness non-uniformity by making the blue light path and the other two color light path to have nearly the same optical light path length.

The light emitted from each of the color light transmissive light modulation devices 520R, 520G, and 520B enters the cross-dichroic prism 530 from different incident end planes individually. The cross-dichroic prism 530 is a prism in which a blue light reflective dichroic filter 530B and the red light reflective dichroic filter 530R are disposed such that an angle of 45° is formed between each of the filters and the incident optical axis, and both filters are orthogonal with each other in the shape of "X".

The three color lights which have entered the cross-dichroic prism 530, which is a color synthesis optical system, are synthesized. Then the synthesized light is projected by a projection lens 540 to display a full-color image on the screen, which is not shown in the figure.

In a projector using three transmissive light modulation devices, a cross-dichroic prism is often used for the color synthesis optical system. In this case, if the color light reflected by the dichroic filter of the cross-dichroic prism is set to the S polarization light and the color light transmitted through the dichroic filter is set to the P polarization light, it is convenient for improving the light utilization at the time of the color synthesis. Accordingly, in the present embodiment, the structure is employed in which the light emitted from the transmissive light modulation device 520G for green light is set to the P polarization light, the light emitted from the transmissive light modulation devices 520R and 520B for red light and blue light are set to the S polarization light, and thus a bright projection image can be obtained.

Figure 7:
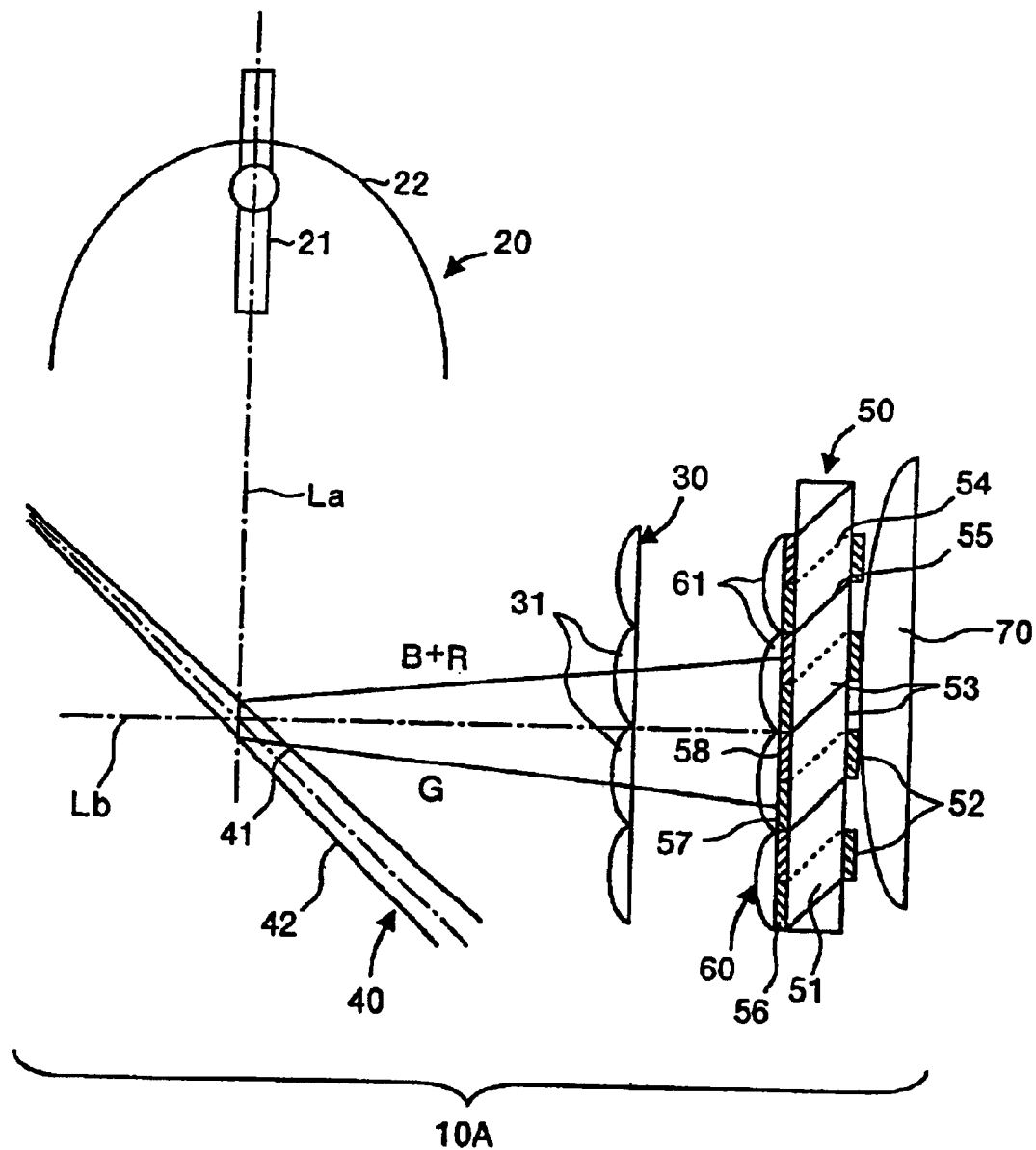
FIG. 7 is a schematic configuration diagram illustrating a sixth embodiment of the projector including an illumination optical system according to the present invention.

FIG. 7 illustrates another embodiment of the projector including an illumination optical system according to the present invention. An illumination optical system 10A according to the present embodiment can be combined with any one of the color separation/synthesis optical system 100 as shown in FIGS. 1, 3, and 4, the color separation/synthesis optical system 130 as shown in FIG. 5, and the color separation optical system and color synthesis optical system having an assumption of the transmissive light modulation device as shown in FIG. 6. The illumination optical system 10A according to this embodiment is different from the illumination optical system 10 according to the second embodiment in that the color light separation optical element 40 is disposed between the light source 20 and the first lens array 30 which is a luminous flux division optical element. The other structure is the same as that of the illumination optical system 10 according to the second embodiment. In the illumination optical system 10A according to this embodiment, the light from the light source 20 is first separated into the first color light (G), and the second color light (B+R), and these first color light (G) and the second color light (B+R) are emitted in slightly different directions with each other.

The first color light (G) and the second color light (B+R) which have entered the first lens array 30 are separated into a plurality of partial luminous fluxes, respectively, by each of the small lenses 31, and then collected. Then after passing through the second lens array 60, the first color partial luminous flux (G) enters the reflective film 55 of the polarization beam splitter array 51 of the polarization change element 50, and the second color partial luminous flux (B+R) enters the polarization separation film 54 of the polarization beam splitter array 51. Of these partial luminous fluxes, by the $\lambda/2$ wavelength plate 52, the second color partial luminous flux (B+R) is uniformed into the S polarization light, the first color partial luminous flux (G) is uniformed into the P polarization light, and they are superposed onto the illuminated area by the superposition lens 70.

With the illumination optical system 10A according to this embodiment, the same operation and effect can be obtained as those of the illumination optical system 10 according to the second embodiment described above. In addition, since the color light separation optical element 40 is disposed between the light source 20 and the first lens array 30, and highly parallelized luminous fluxes enter the color light separation optical element 40, as compared with the other embodiments, in the color light separation optical element 40, the separation of the color light can be performed with more efficiently and without fail. In this regard, in the present embodiment, the dichroic mirror 41 and the reflective mirror 42 of the color light separation optical element 40 are disposed at the angle described in the second embodiment, however, they may be disposed at the angle described in the first embodiment or the third embodiment.

Figure 8:
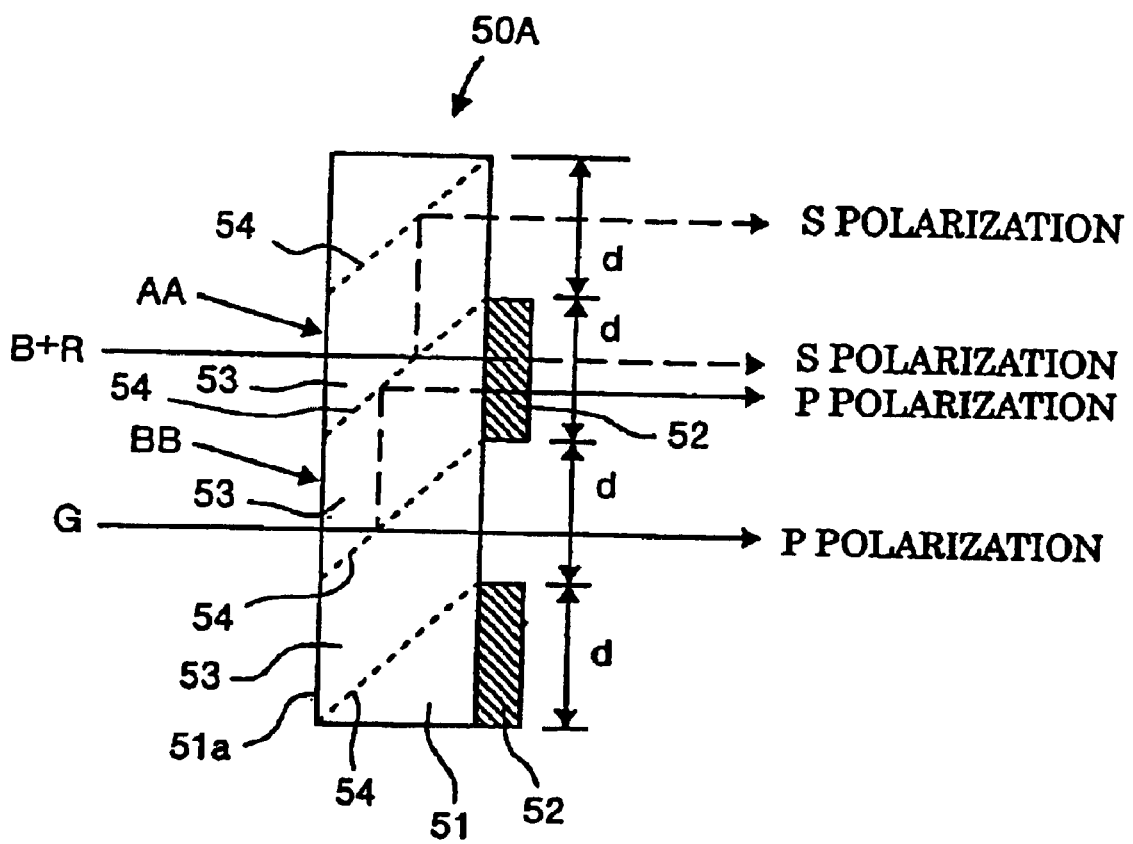
FIG. 8 is a sectional view illustrating the detailed structure of a modified example of a polarization change element.
Figure 9:
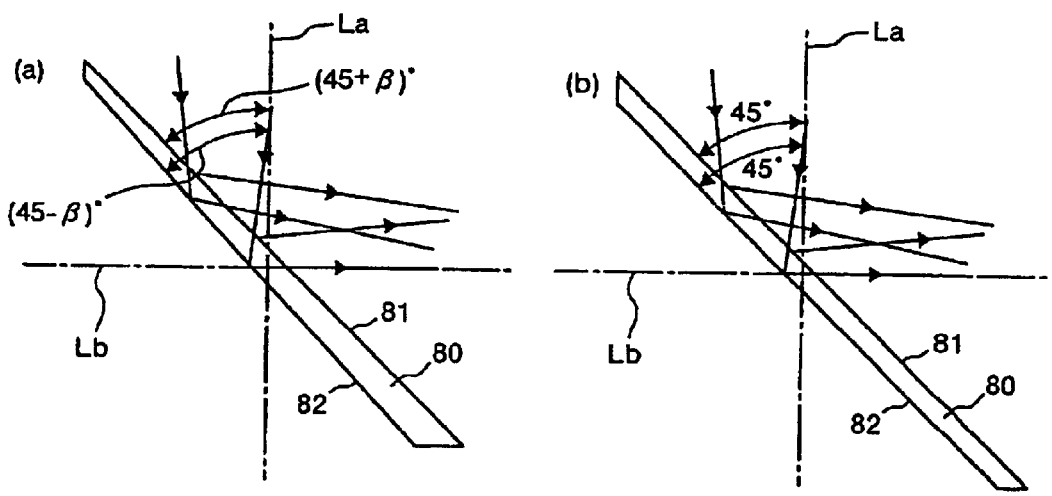
FIGS. 9(a) and 9(b) are diagrams illustrating other embodiments of the color light separation optical elements used in an illumination optical system according to the present invention.
Figure 10:
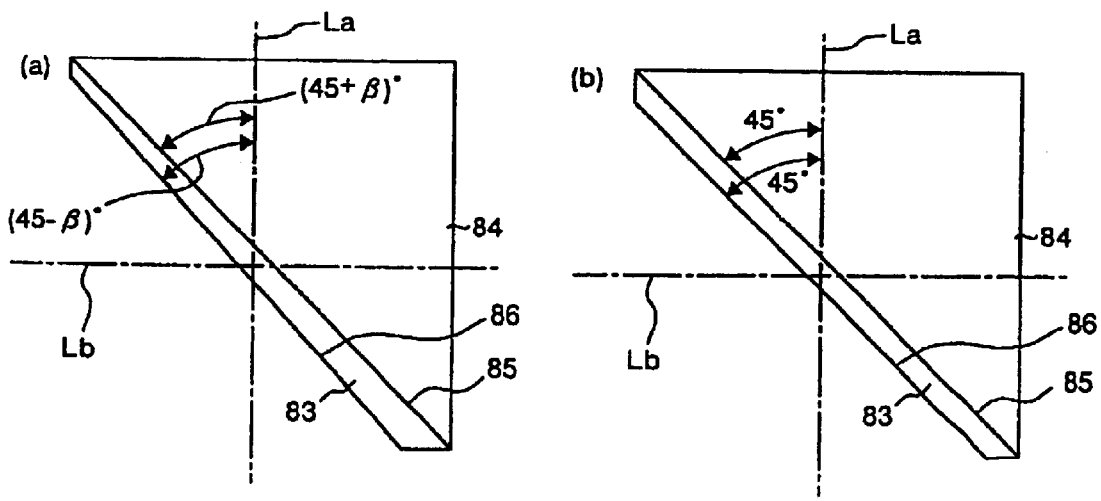
FIGS. 10(a) and 10(b) are diagrams illustrating other embodiments of the color light separation optical elements used in an illumination optical system according to the present invention.
Figure 11:
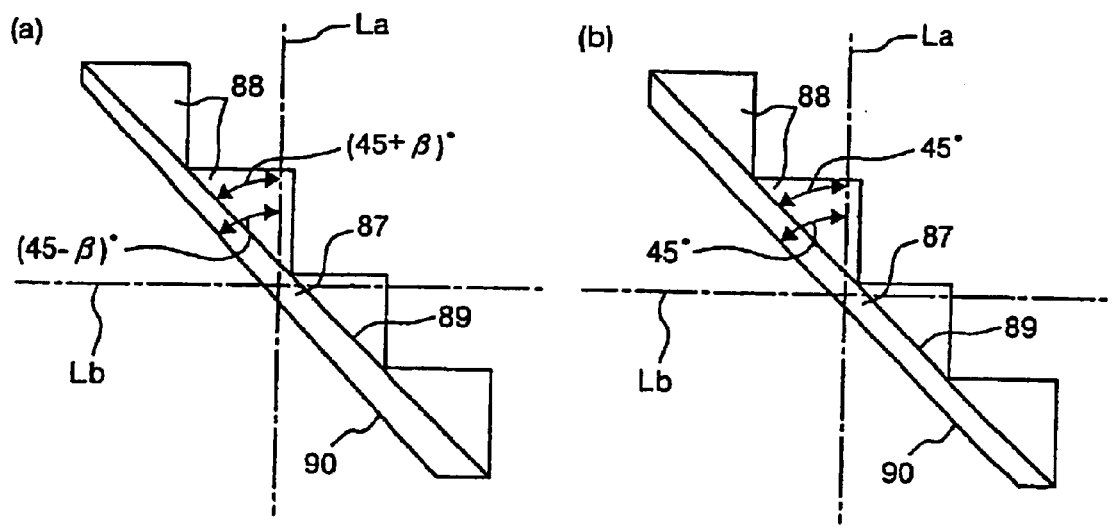
FIGS. 11(a) and 11(b) are diagrams illustrating other embodiments of the color light separation optical element used in an illumination optical system according to the present invention.

FIG. 8 is a diagram illustrating the structure of a polarization change element 50A according to a modified example of the illumination optical system of the present invention. The polarization change element 50A is different from the polarization change element 50 shown in FIG. 2 in that it is constructed only by the polarization separation film 54 without using the reflective film 55 (FIG. 2). The other structure is the same as the illumination optical system 10 according to the second embodiment. In this regard, in FIG. 8, the same reference numerals as those given in FIG. 2 will be given to the component corresponding to the component in FIG. 2, and the description thereof will be omitted.

First, a description will be given of the structure of the polarization change element 50A according to the modified example. In the same manner as in FIG. 2, the polarization beam splitter array 51 has a structure in which a plurality of columnar translucent members 53 having a parallelogram in sectional view are bonded. On the boundary faces of the adjacent translucent members 53, the polarization separation films 54 are disposed at a predetermined distance d. Here, the predetermined distance d is equal to the distance between the polarization separation film 54 and the reflective film 55 in the polarization change element 50 described above. The polarization separation film 54 is inclined at a angle of about 45° to an incident end plane 51a of the polarization change element 50A. Also, the number of the polarization separation films 54 corresponds to about twice as the number of columns N or the number of rows M of the first lens array 30. In other words, the number of polarization separation films 54 of the polarization change element 50A is nearly equal to the total number of the polarization separation films 54 and the reflective films 55 in the polarization change element 50.

The $\lambda/2$ wavelength plates 52 are disposed at a pitch of $2d$, spaced at a predetermined distance d, and corresponding to the every other polarization separation films 54.

In the polarization change element 50A of the modified example, the second color partial luminous fluxes (for example, B+R) which enter the incident end plane AA where the $\lambda/2$ wavelength plate 52 is disposed on the back (emitting) side of the polarization separation film 54 are all transformed into the S polarization light having the second polarization direction. Also, in the polarization change element 50A, the first color partial luminous fluxes (for example, G) which enter the incident end plane BB where the $\lambda/2$ wavelength plate 52 is not disposed on the back (emitting) side of the polarization separation film 54 are all transformed into the P polarization light having the first polarization direction.

Next, a description will be given of the function of the polarization change, element 50A. The second color partial luminous flux (for example, B+R) which has entered the polarization separation film 54 from the incident end plane AA of the polarization beam splitter array 51 is separated into the P polarization light which is transmitted through the polarization separation film 54 and the S polarization light which is reflected. The P polarization light which has transmitted through the polarization separation film 54 is rotated 90° in the polarization direction by passing through the $\lambda/2$ wavelength plate 52 to be transformed into the S polarization light. On the other hand, the S polarization light which has been reflected by the polarization separation film 54 is reflected once again by the adjacent polarization separation film 54, and is emitted without passing through the $\lambda/2$ wavelength plate 52. Thus the polarization direction is still that of the S polarization light without change. Accordingly, the second color partial luminous flux (B+R) which has entered the polarization separation film 54 from the incident end plane AA is uniformed into the S polarization light, and emitted from the polarization change element 50A.

At the same time, the first color partial luminous flux (G) which has entered the polarization separation film 54 from the incident end plane BB of the polarization beam splitters array 51 is separated into the P polarization light which is transmitted through the polarization separation film 54 and the S polarization light which is reflected. The P polarization light which has been transmitted through the polarization separation film 54 does not pass through the $\lambda/2$ wavelength plate 52 to be emitted. Accordingly, the polarization direction is not changed, and is still the P polarization light. On the other hand, the S polarization light which has been reflected by the polarization separation film 54 is reflected once again by the adjacent polarization separation film 54, and is rotated 90° in the polarization direction by passing through the $\lambda/2$ wavelength plate 52 to be transformed into the P polarization light. Accordingly, the first color partial luminous flux (G) which has entered into the polarization separation film 54 from the incident end plane BB is uniformed into the P polarization light, and emitted from the polarization change element 50A.

In this regard, in FIG. 8, the light representation by a solid line and the light representation by a broken line indicate the P polarization light and the S polarization light, respectively.

Of course, it may be structured in which the first color partial luminous flux (for example, G) enters the incident end plane AA, and the first color partial luminous flux emitted from the polarization change element 50A is all transformed into the S polarization light, and the second color partial luminous flux (for example, B+R) enters the incident end plane BB, and the second color partial luminous flux emitted from the polarization change element 50A is all transformed into the P polarization light. In summary, by entering the first and the second color partial luminous fluxes selectively onto the adjacent incident end planes AA and BB corresponding to the existence or non-existence of the disposition of the $\lambda/2$ wavelength plate 52, it becomes possible to uniform the polarization direction for each color light. In the polarization change element 50A, as compared with the polarization change element 50 described above, of the first color partial luminous flux and second color partial luminous flux within the polarization change element, it is possible to make the difference of the light path length smaller between the partial luminous flux having the shortest light path and the partial luminous flux having the longest light path. Thus, in the illuminated area, it is possible to make the magnification factor of the first color partial luminous flux and the magnification factor of the second color partial luminous flux the same. Consequently, the partial luminous flux can be combined and superposed at high illumination efficiency. Also, while the polarization beam splitter array 51 of the polarization change element 50 has the polarization separation films and the reflective films, the polarization beam splitter array 51 of the polarization change element 50A has only the polarization separation films. Thus the structure of the polarization beam splitter array is simple, and it is therefore easy to be manufactured.

FIGS. 9 to 14 illustrate other embodiments of a color light separation optical element. These color light separation optical elements can replace the color light separation optical element 40 in the illumination optical systems 10 and 10A described above. The color light separation optical elements shown in FIGS. 9(a) and 9(b) are integral optical parts constructed by a translucent member 80 having two opposing planes, a dichroic mirror 81 disposed on one of the planes, and a reflective mirror 82 disposed on the other of the planes.

The color light separation optical elements shown in FIGS. 10(a) and 10(b) each have a structure in which a rectangular prism 84 is bonded to one of the planes of a translucent member 83 having two opposing planes. A dichroic mirror 85 is disposed between the translucent member 83 and the rectangular prism 84, and a reflective mirror 86 is disposed on the other plane of the translucent member 83.

The color light separation optical elements shown in FIGS. 11(a) and 10(b) each have a structure in which a plurality of small size rectangular prisms 88 are bonded in a stairs pattern to one of the planes of a translucent member 87 having two opposing planes. A dichroic mirror 89 is disposed between the translucent member 87 and the small size rectangular prisms 88, and a reflective mirror 90 is disposed on the other plane of the translucent member 87.

In the color light separation optical elements shown in FIGS. 9(a), 10(a) and 11(a), the dichroic mirrors 81, 85, and 89, and the reflective mirrors 82, 86, and 90 are not parallel to each other, but are disposed at angles of $(45+\beta)°$ and $(45-\beta)°$ to an optical axis La of the light source, respectively. The dichroic mirrors 81, 85, and 89, and the reflective mirrors 82, 86, and 90 may be disposed at angles of 45° and $(45-\alpha)°$ to the optical axis La of the light source, respectively. Or else, they may be disposed at angles of $(45+\alpha)°$ and 45° to the optical axis La of the light source, respectively. On the other hand, in the color light separation optical elements shown in FIGS. 9(b), 10(b) and 11(b), the dichroic mirrors 81, 85, and 89, and the reflective mirrors 82, 86, and 90 are parallel to each other, and are disposed at an angle of 45° to the optical axis La of the light source, respectively. How to set the above-described disposition angle for the dichroic mirrors and reflective mirrors is as described in the above-mentioned embodiments.

The dichroic mirrors 81, 85, and 89 as the first mirror correspond to the dichroic mirror 41 of the color light separation optical element 40, and thus the structure can be the same as this. Also, the reflective mirrors 82, 86, and 90 as the second mirror correspond to the reflective mirror 42 of the color light separation optical element 40, and thus the structure can be the same as this.

These color light separation optical elements are constructed as one optical part. Thus when using these color light separation optical elements, the devices are easily assembled. Furthermore, in the color light separation optical elements shown in FIGS. 10(a) and 10(b), light enters the dichroic mirror 85 through the rectangular prism 84 having a refraction factor greater than 1. Thus the incident angle of the light on the dichroic mirror 85 is narrowed, so that the light separation characteristic of the dichroic mirror 85 is enhanced. At the same time, if the rectangular prism 84 and the translucent member 83 have the same refraction factor, when light goes from the rectangular prism 84 to the dichroic mirror 85, refraction does not occur at the boundary surface, and thus there is an effect to decrease light loss at the boundary surface. Furthermore, in the color light separation optical elements shown in FIGS. 11(a) and 11(b), in addition to the similar characteristics of the color light separation optical elements shown in FIGS. 10(a) and 10(b), the prism part can be miniaturized, and thus the color light separation optical element can be miniaturized and the weight thereof can be saved. In this regard, in the cases of the color light separation optical elements shown in FIGS. 9 to 11, medium having a fraction factor greater than 1 lies between the dichroic mirror and the reflective mirror, and thus it is necessary to set the distance between the dichroic mirror and the reflective mirror in consideration of the refraction factor of the interposing medium. Particularly in the color light separation optical elements shown in FIG. 9, when light enters the medium through the air, the light is refracted and light path shift occurs. It is therefore necessary to consider this point.

Figure 12:
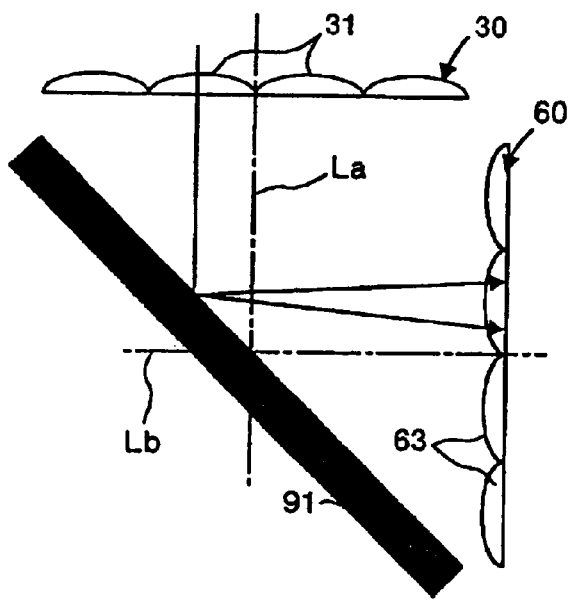
FIG. 12 is a diagram illustrating another embodiment of the color light separation optical element used in an illumination optical system according to the present invention.
Figure 13:
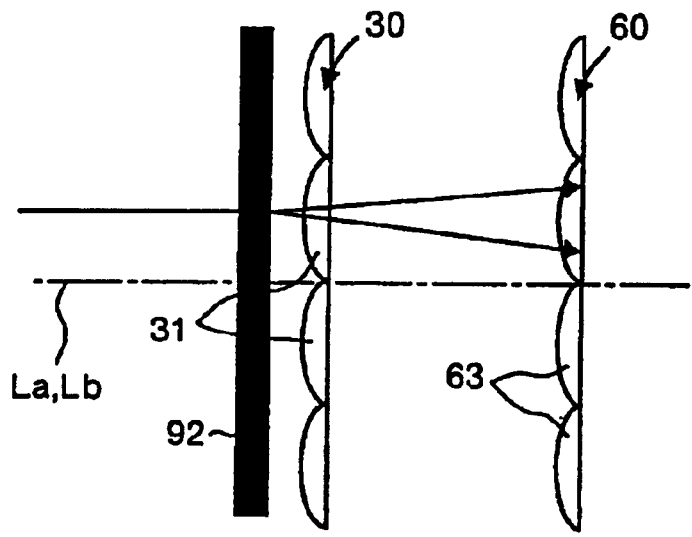
FIG. 13 is a diagram illustrating another embodiment of the color light separation optical element used in an illumination optical system according to the present invention.
Figure 14:
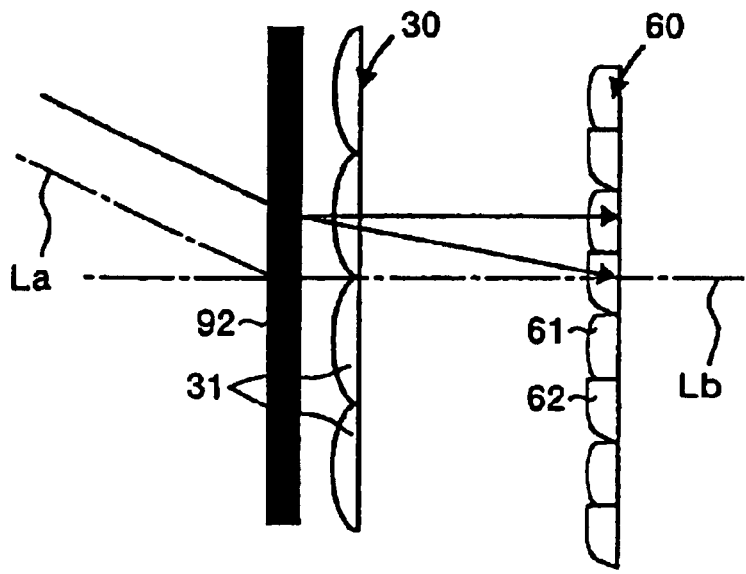
FIG. 14 is a diagram illustrating another embodiment of the color light separation optical element used in an illumination optical system according to the present invention.

The color light separation optical element shown in FIG. 12 is made of a reflective hologram element 91, and the color light separation optical elements shown in FIG. 13 and FIG. 14 are made of transmissive hologram elements 92. In FIGS. 12 to 14, the same reference numerals as those given in FIGS. 1 to 3 will be given to the corresponding components to FIGS. 1 to 3, and the description thereof will be omitted. The reflective hologram element 91 and the transmissive hologram element 92 can be disposed either at the front or the back of the first lens array 30, which is a luminous flux division optical element. Also, for both a reflective type and a transmissive type, the directions of the separated light can be set to either symmetric or asymmetric to the light axis Lb. FIGS. 12 and 13 show the cases of symmetry, and FIG. 14 shows the case of asymmetry. In the case of symmetry, the second lens array 60, which is composed of only concentric lenses 63, as shown in FIG. 3, can be used. However, in the case of asymmetry, the second lens array 60, which is composed of concentric lenses 61 and eccentric lenses 62, as shown in FIG. 1, is used. When using the hologram element as described above, the number of parts of the color light separation optical element can be reduced, and thus the illumination optical system and a projector using this element can be miniaturized and the weight thereof can be saved.

Figure 15:
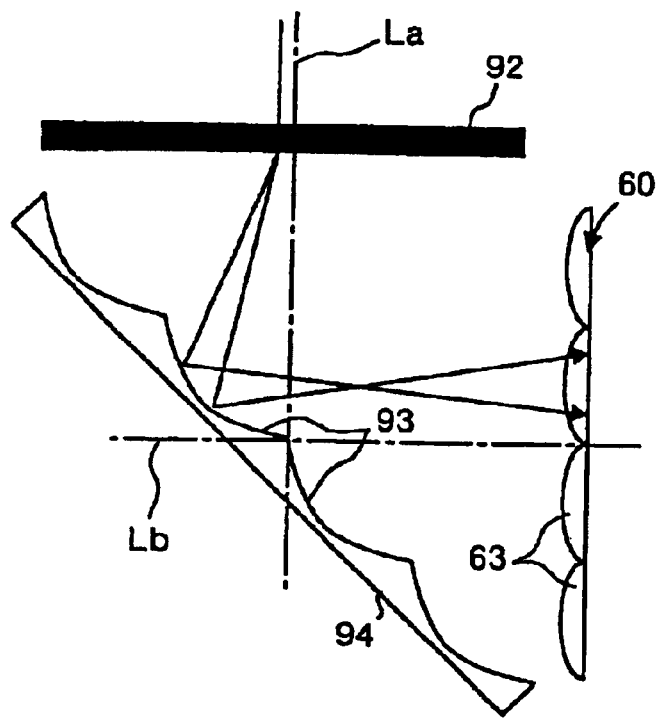
FIG. 15 is a diagram illustrating another embodiment of the luminous flux division optical system and the color light separation optical element used in an illumination optical system according to the present invention.

In the embodiment shown in FIG. 15, as a luminous flux division optical element, instead of the first array 30, a mirror array 94 on which a small concave mirrors 93 are disposed in a matrix is used. Also, the color light separation optical element is made of the transmissive hologram elements 92. The second lens array 60 is the same as the lens array 60 in the second embodiment. The portion illustrated in this figure can replace the first lens array 30, color light separation optical element 40, and the second lens array 60 in FIGS. 1, 3, 5, and 6. The small concave mirrors 93 serve the same function as the small lenses 31 of the first lens array 30. Accordingly, the mirror array 94 performs the same function as the first lens array 30, and the price becomes lower than the case of using lenses. Also, in the case of the mirror array 94, spherical aberration, which always accompanies with a lens array, does not occur. Thus the light condensing can be increased and the illumination efficiency can be improved.

It should be understood that the present invention is not limited to the above-described embodiments, and various modifications and changes can be made within the scope not departing from the spirit and scope of the invention. For example, the following changes are available.

The color light separation by the color light separation optical element is not limited to the separation into the green light and the blue+red light. The separation into the blue light and the green+red light, or the separation into the red+green light and the blue light may be possible. Such a combination of colors can be set arbitrarily by selecting the light separation characteristic of the dichroic mirror 41. For example, the dichroic mirror 41 may have such a characteristic that reflects the green light selectively, and transmits the other color lights.

A description will be given of the effect of the combination of color light separation using the projector according to the first embodiment shown in FIG. 1. In the case of the combination of the blue light and the green+red light, in FIG. 1, the reflective liquid crystal panel 200R for red light is disposed instead of the reflective liquid crystal panel 200G for green light at the opposing position of the incident/emitting end plane 116. In this case, the utilization efficiency of the red light can be increased. Accordingly, if a high-pressure mercury lamp which contains less red light, for example, is used as the light source lamp 21, color balance can be secured easily. Consequently, the color reproducibility and the color utilization efficiency of the projector can be increased.

Also, in the combination of the red light and the green+blue light, in FIG. 1, the reflective liquid crystal panel 200B for blue light is disposed instead of the reflective liquid crystal panel 200G for green light at the opposing position of the incident/emitting end plane 116. In this case, less blue light is absorbed at the dichroic prism 120. Accordingly, depolarization of blue light by the photo-elastic effect can be prevented. Consequently, the color reproducibility and the color utilization efficiency of the projector can be increased.

Also, setting of the polarization directions of the first color light and second color light is not limited to the embodiments described above. The polarization state can be arbitrary set in response to the structure of the color separation/synthesis optical system 100. For example, an optical structure can be adopted in which the first color light is uniformed into the S polarization light, and the second color light is uniformed into the P polarization light. In other words, when the $\lambda/2$ wavelength plate 52 is disposed at the back (emitting side) of the polarization separation film where a specific color light enters, the specific color light is transformed into the S polarization light to be emitted. Also, when the $\lambda/2$ wavelength plate 52 is not disposed at the back (emitting side) of the polarization separation film where a specific color light enters, the specific color light is transformed into the P polarization light to be emitted.

Furthermore, in the above-described embodiments, the arrangement is made in which the second color partial luminous flux reflected by the dichroic mirror 41 of the color light separation optical element 40 enters the polarization separation film 54 of the polarization change element 50, and the first color partial luminous flux reflected by the reflective mirror 42 enters the reflective film 55. However, the corresponding relation between the first color and second color partial luminous flux, and the polarization separation film 54 and the reflective film 55 can be opposite to the relation described above. Specifically, a structure can be employed in which the first color partial luminous flux enters the polarization separation film 54, and the second color partial luminous flux enters the reflective film 55. However when the polarization change element 50 is used, considering the light path length difference between the first color partial luminous flux and the second color partial luminous flux, which occurs between the first lens array 30 and the second lens array 60, and between the polarization change element 50 and the color separation/synthesis optical system 100, the corresponding relation in the embodiments described above is most suitable. In this regard, if the lens characteristic of the first and the second lens arrays 30 and 60 is set appropriately, a polarization change element can be used in which pairs of the polarization separation films 54 and the reflective films 55 are disposed such that the light axis Lb is set to the folding position as an axis of symmetry.

Furthermore, in some of the embodiments described above, the angle formed by the light axis La and the light axis Lb is set to 90°, and the light from the light source 20 enters the color light separation optical element 40 at an angle of 45°. However, the angle formed by the light axis La and the light axis Lb may be set smaller than 90°, and the light from the light source 20 may enter the color light separation optical element 40 at a smaller angle than 45°. In this case, the light separation characteristic and the reflective characteristic of the dichroic mirror 41 and the reflective mirror 42 to be used for the color light separation optical element 40 can be easily improved, and thus high light utilization can be achieved. Also, on the contrary, a structure may be employed in which the angle formed by the light axis La and the light axis Lb is larger than 90°. By this means, the degree of freedom in the optical system layout can be increased.

Moreover, in the embodiments described above, a light guiding rod having a plurality of reflective planes can be used instead of the lens array 30 which is a luminous flux division optical element. Such a light guiding rod has been disclosed in Japanese Unexamined Patent Application Publication No. 10-161237, and is well known. Thus the detailed description thereof will be omitted. If a light guiding rod is used, as in the case of the mirror array 94 spherical aberration, which always accompanies with a lens array, does not occur. Thus light condensing is enhanced, and illumination efficiency can be improved.

Also, the illumination optical system of the present invention can be used for illuminating the various light modulating devices, regardless of the reflective type or the transmissive type, as illustrated in the foregoing embodiments.

As will be understood from the above description, according to the illumination optical system of the present invention, non-polarized light from a light source is transformed into polarization luminous flux which has a uniform polarization direction for each color light in advance, thus it is possible to reduce the polarization dependency of the optical elements, such as dichroic prisms and polarization beam splitters, which are disposed at more downstream side of the light path than the illumination optical system. It is therefore possible to increase illumination efficiency.

By adopting the illumination optical system in a projector, it is also possible to improve the brightness, the image quality, and the contrast of the projection image. Moreover, as compared with the case of using the conventional illumination optical system, the number of parts can be reduced and lowering the cost can be realized.

Industrial Applicability

As described above, according to an illumination optical system of the present invention, it is possible to efficiently generate illumination light having a specific color light whose polarization direction is different by 90° to that of the other color light, and to illuminate an illuminated area with uniform illuminance distribution using such illumination light.

Also, according to a projector of the present invention, by applying the above-described illumination optical system, it is possible to reduce polarization dependency of a light separation characteristic of a dichroic plane which constitutes a color separation/synthesis optical system. Moreover, as compared with the case of using the conventional illumination optical system, the number of parts can be reduced and lowering the cost can be realized.

What is claimed is:

1. An illumination optical system, comprising:

a luminous flux division optical element which divides light from a light source into a plurality of pieces of partial luminous fluxes and collects each of the partial luminous fluxes;

a color light separation optical element which separates each of the partial luminous flux into first color partial luminous flux and second color partial luminous flux, and emits the first color partial luminous flux and the second color partial luminous flux in at least one of different directions with each other and in a direction parallel to each other;

a polarization change element which includes a polarization beam splitter array in which a plurality of polarization separation films and a plurality of reflective films are arranged alternately, and a polarization direction rotation element which is disposed either at a position where light transmitted through the polarization separation film is emitted or at a position where light reflected by the reflective film is emitted, the first color partial luminous flux incident on the polarization separation film being uniformed in a first polarization direction to be emitted, and the second color partial luminous flux incident on the reflective film being uniformed in a second polarization direction different from the first polarization direction to be emitted;

a transmission optical element which is disposed either at an incident side or at an emitting side of the polarization change element, that transmits an image formed by the luminous flux division optical element to an illuminated area; and a superposition optical element that superposes the partial luminous fluxes emitted from the polarization change element at the illuminated area.

2. The illumination optical system according to claim 1, the color light separation optical element including a first mirror and a second mirror, the first mirror being a dichroic mirror for color separation, and the second mirror being a reflective mirror.

3. The illumination optical system according to claim 2, the first mirror and the second mirror being not parallel to each other, the first mirror being disposed at an angle of 45° to an optical axis of the light source, and the second mirror being disposed at an angle of $(45-\alpha)°$ to the optical axis of the light source.

4. The illumination optical system according to claim 2, the first mirror and the second mirror being not parallel to each other, the first mirror being disposed at an angle of $(45+\alpha)°$ to the optical axis of the light source, and the second mirror being disposed at an angle of 45° to the optical axis of the light source.

5. The illumination optical system according to claim 2, the first mirror and the second mirror being not parallel to each other, the first mirror being disposed at an angle of $(45+\beta)°$ to the optical axis of the light source, and the second mirror being disposed at an angle of $(45-\beta)°$ to the optical axis of the light source.

6. The illumination optical system according to claim 2, the first mirror and the second mirror being parallel to each other, and disposed at an angle of 45° to the optical axis of the light source.

7. The illumination optical system according to claim 1, the color light separation optical element including an optical part having a plate translucent member, a dichroic mirror disposed on one of two planes opposed with each other of the translucent member, and a reflective mirror disposed on the other of the planes.

8. The illumination optical system according to claim 7, the one of the planes and the other of the planes being not parallel to each other, the one of the planes being disposed at an angle of 45° to the optical axis of the light source, and the other of the planes being disposed at an angle of $(45-\alpha)°$ to the optical axis of the light source.

9. The illumination optical system according to claim 7, the one of the planes and the other of the planes being not parallel to each other, the one of the planes being disposed at an angle of $(45+\alpha)°$ to the optical axis of the light source, and the other of the planes being disposed at an angle of 45° to the optical axis of the light source.

10. The illumination optical system according to claim 7, the one of the planes and the other of the planes being not parallel to each other, the one of the planes being disposed at an angle of $(45+\beta)°$ to the optical axis of the light source, and the other of the planes being disposed at an angle of $(45-\beta)°$ to the optical axis of the light source.

11. The illumination optical system according to claim 7, the one of the planes and the other of the planes being parallel to each other, and individually disposed at an angle of 45° to the optical axis of the light source.

12. The illumination optical system according to claim 1, the color light separation optical element including an optical part having a plate translucent member, a rectangular prism fixed firmly on one of two planes opposed with each other of the translucent member, a reflective mirror disposed on the other of the planes, and a dichroic mirror disposed between the translucent member and the rectangular prism.

13. The illumination optical system according to claim 1, the color light separation optical element including an optical part having a plate translucent member, a plurality of small size rectangular prisms fixed firmly on one of two planes opposed with each other of the translucent member, a reflective mirror disposed on the other of the planes, and a dichroic mirror disposed between the translucent member and the rectangular prisms.

14. The illumination optical system according to claim 1, the color light separation optical element including a reflective hologram element.

15. The illumination optical system according to claim 1, the color light separation optical element including a transmissive hologram element.

16. The illumination optical system according to claim 1, the luminous flux division optical element including a lens array.

17. The illumination optical system according to claim 15, the luminous flux division optical element including a mirror array.

18. The illumination optical system according to claim 1, the luminous flux division optical element including a light guiding rod having four reflection planes.

19. The illumination optical system according to claim 1, a dichroic filter array being disposed in order to block unnecessary incident color light on an incident side of the polarization beam splitter array.

20. The illumination optical system according to claim 1, the color light separation optical element having a color separation characteristic which separates green light from red and blue light.

21. A projector, comprising:

an illumination optical system according to claim 1;

a light modulation device which modulates the light emitted from the illumination optical system; and a projection lens which projects the light modulated by the light modulation device.

22. A projector, comprising:

an illumination optical system according to claim 1;

a first reflective light modulation device that modulates the first color light emitted from the illumination optical system;

a second reflective light modulation device that modulates a third color light included in the second color light emitted from the illumination optical system;

a third reflective light modulation device that modulates the fourth color light included in the second color light emitted from the illumination optical system;

a polarization beam splitter that separates the light emitted from the illumination optical system into the first color light and the second color light; and a projection lens which includes a color light separation/synthesis element that separates the second color light into the third color light and the fourth color light and also that synthesizes the light emitted from the second reflective light modulation device and the light emitted from the third reflective light modulation device to emit to the polarization beam splitter, the light selected by the polarization beam splitter out of the light emitted from the first reflective light modulation device and the light emitted from the color light separation/synthesis element being projected.

23. A projector, comprising:

an illumination optical system according to claim 1;

a first reflective light modulation device that modulates the first color light included in the light emitted from the illumination optical system;

a second reflective light modulation device that modulates a third color light included in the second color light emitted from the illumination optical system;

a third reflective light modulation device that modulates a fourth color light included in the second color light emitted from the illumination optical system;

first to fourth polarization beam splitters;

a first wavelength selection retardation film disposed between the first polarization beam splitter and the third polarization beam splitter;

a second wavelength selection retardation film disposed between the third polarization beam splitter and the fourth polarization beam splitter; and a projection lens that projects the light emitted from the fourth polarization beam splitter, the first polarization beam splitter separating the light emitted from the illumination optical system into the first color light and the second color light, the second polarization beam splitter leads the first color light separated by the first polarization beam splitter into the first reflective light modulation device, and also leads the first color light modulated by the first reflective light modulation device into the fourth polarization beam splitter, the first wavelength selection retardation film rotates about 90° only a polarization direction of the third color light out of the third color light and the fourth color light included in the second color light separated by the first polarization beam splitter, the third polarization beam splitter leads the third color light and the fourth color light emitted from the first wavelength selection retardation film into the second reflective light modulation device and the third reflective light modulation device, and also leads the third color light and the fourth color light modulated by the second reflective light modulation device and the third reflective light modulation device into the second wavelength selection retardation film, the second wavelength selection retardation film rotates about 90° only a polarization direction of the third color light out of the third color light and the fourth color light emitted from the third polarization beam splitter, and the fourth polarization beam splitter synthesizes the first color light emitted from the second polarization beam splitter, and the third color light and the fourth color light emitted from the second wavelength selection retardation film, and emits it toward the projection lens.

24. A projector, comprising:

an illumination optical system according to claim 1;

a color separation optical system that separates the light emitted from the illumination optical system into first color light, second color light, and third color light;

a first transmissive light modulation device that modulates the first color light separated by the color separation optical system in response to an image signal;

a second transmissive light modulation device that modulates the second color light separated by the color separation optical system in response to an image signal;

a third transmissive light modulation device that modulates the third color light separated by the color separation optical system in response to an image signal;

a color synthesis optical system that synthesizes the first color light, the second color light, and the third color light which have been modulated by the first transmissive light modulation device, the second transmissive light modulation device, and the third transmissive light modulation device, respectively; and a projection lens that projects the light synthesized by the color synthesis optical system.

25. An illumination optical system, comprising:

a color light separation optical element which separates light from a light source into a first color light and a second color light, and emits the first color light and the second color light in at least one of different directions with each other and in a direction parallel to each other;

a luminous flux division optical element which divides the first color light into a plurality of the first color luminous fluxes, divides the second color light into a plurality of the second color luminous fluxes, and collects each of the partial luminous fluxes;

a polarization change element which includes a polarization beam splitter array in which a plurality of polarization separation films and a plurality of reflective films are arranged alternately, and a polarization direction rotation element which is disposed either at a position where light transmitted through the polarization separation film is emitted or at a position where light reflected by the reflective film is emitted, the first color partial luminous flux incident on the polarization separation film being uniformed into polarized light having a first polarization direction, and the second color partial luminous flux incident on the reflective film being uniformed into polarized light having a second polarization direction different from the first polarization direction;

a transmission optical element which is disposed either at an incident side or at an emitting side of the polarization change element, that transmits an image formed by the luminous flux division optical element to an illuminated area; and a superposition optical element that superposes the partial luminous fluxes emitted from the polarization change element at the illuminated area.

26. An illumination optical system, comprising:

a luminous flux division optical element which divides light from a light source into a plurality of partial luminous fluxes and collects each of the partial luminous fluxes;

a color light separation optical element which separates each of the partial luminous flux into first color partial luminous flux and second color partial luminous flux, and emits the first color partial luminous flux and the second color partial luminous flux in at least one of different directions with each other and in a direction parallel to each other;

a polarization change element which includes a polarization beam splitter array in which a plurality of polarization separation films are arranged at a predetermined interval, and a polarization direction rotation elements which are disposed at an emitting side of the polarization beam splitter array at the predetermined interval, the first color partial luminous flux incident on an incident side end plane of the polarization separation film where the polarization direction rotation elements are not disposed at an emitting side of the film and transmitting through the polarization separation film, and the first color partial luminous flux reflected by the polarization separation film and then reflected by an adjacent polarization separation film once again and transmitting through the polarization direction rotation elements being uniformed in a first polarization direction to be emitted, the second color partial luminous flux incident on an incident side end plane of the polarization separation film where the polarization direction rotation elements are disposed at an emitting side of the film and the flux transmitting through the polarization separation film and then transmitting through the polarization direction rotation element, and the second color partial luminous flux reflected by the polarization separation film and then reflected by an adjacent polarization separation film once again being uniformed in a second polarization direction different from the first polarization direction to be emitted;

a transmission optical element which is disposed either at an incident side or at an emitting side of the polarization change element, and transmits an image formed by the luminous flux division optical element on an illuminated area; and a superposition optical element that superposes the partial luminous fluxes emitted from the polarization change element at the illuminated area.

27. An illumination optical system, comprising:

a color light separation optical element which separates light from a light source into first color light and second color light, and emits the first color light and the second color light in at least one of different directions with each other and in a direction parallel to each other;

a luminous flux division optical element which divides the first color light into a plurality of the first color luminous fluxes, divides the second color light into a plurality of the second color luminous fluxes, and collects each of the partial luminous fluxes;

a polarization change element which includes a polarization beam splitter array in which a plurality of polarization separation films are arranged at a predetermined interval, and a polarization direction rotation elements which are disposed at an emitting side of the polarization beam splitter array at the predetermined interval, the first color partial luminous flux incident on an incident side end plane of the polarization separation film where the polarization direction rotation elements are not disposed at an emitting side of the film and transmitting through the polarization separation film, and the first color partial luminous flux reflected by the polarization separation film and then reflected by an adjacent polarization separation film once again and transmitting through the polarization direction rotation element being uniformed in a first polarization direction to be emitted, the second color partial luminous flux incident on an incident side end plane of the polarization separation film where the polarization direction rotation element is disposed at an emitting side of the film and transmitting through the polarization separation film and then transmitting through the polarization direction rotation element, and the second color partial luminous flux reflected by the polarization separation film and then reflected by an adjacent polarization separation film once again being uniformed in a second polarization direction different from the first polarization direction to be emitted;

a transmission optical element which is disposed either at an incident side or at an emitting side of the polarization change element, and transmits an image formed by the luminous flux division optical element on an illuminated area; and a superposition optical element that superposes the partial luminous flux emitted from the polarization change element at the illuminated area.

* * * * *